US009397368B2

(12) United States Patent
Koh et al.

(10) Patent No.: US 9,397,368 B2
(45) Date of Patent: Jul. 19, 2016

(54) NON-AQUEOUS ELECTROLYTE SOLUTION

(75) Inventors: Meiten Koh, Settsu (JP); Hideo Sakata, Settsu (JP); Hitomi Nakazawa, Settsu (JP); Kyouhei Sawaki, Settsu (JP); Tomoyo Sanagi, Settsu (JP); Akiyoshi Yamauchi, Settsu (JP); Aoi Nakazono, Settu (JP); Akinori Tani, Settsu (JP); Masahiro Tomita, Settsu (JP); Yuki Adachi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 10 days.

(21) Appl. No.: 13/880,233

(22) PCT Filed: Oct. 11, 2011

(86) PCT No.: PCT/JP2011/073347
§ 371 (c)(1),
(2), (4) Date: Apr. 18, 2013

(87) PCT Pub. No.: WO2012/053395
PCT Pub. Date: Apr. 26, 2012

(65) Prior Publication Data
US 2013/0224606 A1 Aug. 29, 2013

(30) Foreign Application Priority Data

Oct. 19, 2010 (JP) ................................. 2010-234974
Mar. 31, 2011 (JP) ................................. 2011-080300

(51) Int. Cl.
H01M 10/0569 (2010.01)
H01G 11/62 (2013.01)
H01G 11/64 (2013.01)
H01M 10/0567 (2010.01)
H01M 10/0568 (2010.01)
H01G 9/035 (2006.01)
H01M 10/0525 (2010.01)

(52) U.S. Cl.
CPC ........... *H01M 10/0569* (2013.01); *H01G 9/035* (2013.01); *H01G 11/62* (2013.01); *H01G 11/64* (2013.01); *H01M 10/0525* (2013.01); *H01M 10/0567* (2013.01); *H01M 10/0568* (2013.01); *Y02E 60/122* (2013.01); *Y02E 60/13* (2013.01); *Y02T 10/7011* (2013.01); *Y02T 10/7022* (2013.01)

(58) Field of Classification Search
CPC ...................... H01M 10/0568; H01M 10/0569

USPC ......... 252/62.2; 429/199, 200, 332, 338, 340, 429/342
See application file for complete search history.

(56) References Cited

U.S. PATENT DOCUMENTS

| 6,245,465 | B1 | 6/2001 | Angell et al. |
| 2001/0009744 | A1 | 7/2001 | Kim et al. |
| 2008/0076031 | A1 | 3/2008 | Yamaguchi et al. |
| 2010/0033899 | A1 | 2/2010 | Koh |
| 2011/0304950 | A1 | 12/2011 | Ohtsuka et al. |
| 2012/0308881 | A1 | 12/2012 | Tokuda et al. |

FOREIGN PATENT DOCUMENTS

| CN | 101578675 A | | 11/2009 |
| EP | 2012386 A1 | | 1/2009 |
| JP | 2001-223024 A | | 8/2001 |
| JP | 2004-172101 A | | 6/2004 |
| JP | 2008-078116 A | | 4/2008 |
| JP | 2009-093839 A | | 4/2009 |
| JP | 2009-277427 A | | 11/2009 |
| JP | 2010-226100 A | | 10/2010 |
| JP | 2011-187235 A | | 9/2011 |
| JP | 2011-187440 A | | 9/2011 |
| KR | 10-2009-0100249 A | | 9/2009 |
| WO | WO2008084846 | * | 7/2008 |
| WO | 2009/116740 A2 | | 9/2009 |

OTHER PUBLICATIONS

Communication dated Jun. 24, 2014, issued by the European Patent Office in corresponding Application No. 11834235.1.
Xu et al., "Sulfone-Based Electrolytes for Lithium-Ion Batteries", Journal of the Electrochemical Society, The Electrochemical Society, Inc., May 28, 2002, vol. 149, Issue 7, XP-002607636, 7 total pages.
English Translation of International Preliminary Report on Patentability and Written Opinion of the International Searching Authority for PCT Appln. No. PCT/JP2011/073347.

* cited by examiner

*Primary Examiner* — Ladan Mohaddes
(74) *Attorney, Agent, or Firm* — Sughrue Mion, PLLC

(57) ABSTRACT

The present invention directs to a non-aqueous electrolyte solution, including (I) at least one compound selected from the group consisting of fluorinated linear sulfones and fluorinated linear sulfonic acid esters, and (II) an electrolyte salt. Such a non-aqueous electrolyte solution has high oxidation resistance, minimizes its decomposition even when hydrofluoric acid is produced. Also, the solution is less likely to cause, in the case of being used for a secondary cell, swelling of the cell and lowering of the battery performance.

15 Claims, No Drawings

NON-AQUEOUS ELECTROLYTE SOLUTION

CROSS REFERENCE TO RELATED APPLICATIONS

This application is a National Stage of International Application No. PCT/JP2011/073347 filed Oct. 11, 2011, claiming priority based on Japanese Patent Application Nos. 2010-234974, filed Oct. 19, 2010 and 2011-080300, filed Mar. 31, 2011, the contents of all of which are incorporated herein by reference in their entirety.

TECHNICAL FIELD

The present invention relates to a non-aqueous electrolyte solution.

BACKGROUND ART

Typically used non-aqueous electrolyte solutions for electrochemical devices such as lithium-ion secondary batteries are produced by dissolving electrolyte salts (e.g. $LiPF_6$, $LiBF_4$) in non-aqueous solvents (e.g. ethylene carbonate, propylene carbonate, dimethyl carbonate).

In the case of using such an electrolyte salt containing fluorine, however, a very small amount of moisture contained in non-aqueous solvents and electrochemical devices (e.g. electrodes, separator) may react with the solute containing fluorine, to give hydrofluoric acid. When generated, the hydrofluoric acid reacts with the solvent in the electrolyte solution to give off gas. This phenomenon, for example in the case of a lithium-ion secondary battery, causes expansion of the cell, and accumulation of gas between electrodes which inhibits movement of lithium ions and lowers the battery performance.

Patent Literature 1 discloses adding into a non-aqueous electrolyte solution a benzenesulfonate ester that contains at least one fluorine atom and has a sulfonate ester structure. The addition is for production of an electrolyte solution for lithium secondary batteries which exhibits favorable initial cell capacity and cycle characteristics.

Patent Literature 2 discloses use of a C6 to C16 unsaturated hydrocarbon which is a compound containing carbon, fluorine, and hydrogen atoms and having at least one group with a carbon-carbon unsaturated bond, and which contains at least one fluorine atom substituted for a hydrogen atom bonding to a carbon atom. The use is for production of an electrolyte solution which is not likely to have a swollen cell because of decomposition gas in the electrolyte solution, and achieves excellent discharging and charging of the cell.

Also, sulfonate esters mentioned in Patent Literature 1 and Patent Literature 2 are known to go through reductive decomposition to form a film on a negative electrode, and have a possibility of being decomposed to emit gas on a positive electrode because of their low oxidation resistance.

CITATION LIST

Patent Literature

Patent Literature 1: JP 2009-93839 A
Patent Literature 2: JP 2004-172101 A

SUMMARY OF INVENTION

Technical Problem

The present invention aims to provide a non-aqueous electrolyte solution that has high oxidation resistance, minimizes decomposition in the case of hydrofluoric acid production, and is less likely to cause, when used for a secondary battery, swelling of the cell and lowering of the battery performance.

Solution to Problem

That is, the present invention directs to a non-aqueous electrolyte solution, including (I) at least one compound selected from the group consisting of fluorinated linear sulfones and fluorinated linear sulfonic acid esters, and (II) an electrolyte salt.

Advantageous Effects of Invention

Since the non-aqueous electrolyte solution of the present invention has the above composition, the non-aqueous electrolyte solution is not likely to be easily decomposed. For this reason, the non-aqueous electrolyte solution of the present invention is not likely to cause, when used for a secondary battery, swelling of the cell and lowering of the battery performance.

DESCRIPTION OF EMBODIMENTS

The non-aqueous electrolyte solution of the present invention includes (I) at least one compound selected from the group consisting of fluorinated linear sulfones and fluorinated linear sulfonic acid esters, and (II) an electrolyte salt.

(II) Electrolyte Salt

The electrolyte salt (II) and its amount to be used can be selected to suite the intended use of the non-aqueous electrolyte solution of the present invention. For notable achievement of the effects of the present invention, the electrolyte salt (II) preferably contains fluorine atoms as described below. Particularly in the case that the non-aqueous electrolyte solution of the present invention is used for a lithium-ion secondary battery, examples of compounds usable as the electrolyte salt (II) include inorganic lithium salts such as $LiClO_4$, $LiAsF_6$, $LiPF_6$, and $LiBF_4$; and fluorine-containing organic acid lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, lithium difluoro(oxalato)borate, lithium bis(oxalato)borate, and salts represented by the formula: $LiPF_a(C_nF_{2n+1})_{6-a}$, wherein a is an integer of 0 to 5, and n is an integer of 1 to 6. Each of these may be used alone, or two or more of these may be used in combination.

For prevention of degradation of the non-aqueous electrolyte solution after long-term storage, the electrolyte salt (II) is preferably at least one selected from the group consisting of $LiPF_6$, $LiBF_4$, $LiCF_3SO_3$, $LiN(CF_3SO_2)_2$, $LiN(C_2F_5SO_2)_2$, lithium difluoro(oxalato)borate, lithium bis(oxalato)borate, and salts represented by the formula: $LiPF_a(C_nF_{2n+1})_{6-a}$, wherein a is an integer of 0 to 5, and n is an integer of 1 to 6.

Examples of the salts represented by the formula: $LiPF_a(C_nF_{2n+1})_{6-a}$ include $LiPF_3(CF_3)_3$, $LiPF_3(C_2F_5)_3$, $LiPF_3(C_3F_7)_3$, $LiPF_3(C_4F_9)_3$, $LiPF_4(CF_3)_2$, $LiPF_4(C_2F_5)_2$, $LiPF_4(C_3F_7)_2$, and $LiPF_4(C_4F_9)_2$ (here, the alkyl group represented by $C_3F_7$ or $C_4F_9$ may have a straight chain structure or branched structure).

The concentration of the electrolyte salt (II) in the non-aqueous electrolyte solution is preferably 0.5 to 3 mol/L. If the concentration is out of the above range, the electric conductivity of the electrolyte solution may decrease, and the battery performance may decrease.

The concentration of the above electrolyte salt is more preferably 0.9 mol/L or higher, and is more preferably 1.5 mol/L or lower.

In the case that the non-aqueous electrolyte solution of the present invention is used for an electric double layer capacitor, usable compounds for the electrolyte salt (II) include known ammonium salts, metal salts, liquid salts (ionic liquids), inorganic polymer salts, and organic polymer salts. Among these, ammonium salts are preferred. The electrolyte salt (II), however, is not limited to these specific examples including ammonium salts.

Next, examples of the ammonium salts are described.

(IIA) Tetraalkyl Quaternary Ammonium Salts

Preferred examples of the ammonium salts include tetraalkyl quaternary ammonium salts represented by formula (IIA):

[Chem. 1]

$$R^{2a}-\overset{\overset{R^{1a}}{|}}{\underset{\underset{R^{3a}}{|}}{N^{\oplus}}}-R^{4a} \quad X^{\ominus}$$

wherein $R^{1a}$, $R^{2a}$, $R^{3a}$, and $R^{4a}$ are the same as or different from each other, each representing an alkyl group which may include a C1 to C6 ether bond; and $X^-$ is an anion. Also, those ammonium salts in which part or the whole of hydrogen atoms is substituted by fluorine atoms and/or C1 to C4 fluorine-containing alkyl groups are also preferred in terms of improving the oxidation resistance.

Specific examples of such ammonium salts include tetraalkyl quaternary ammonium salts represented by formula (IIA-1):

$$(R^{1a})_x(R^{2a})_y N^{\oplus} X^{\ominus} \quad \text{[Chem. 2]}$$

wherein $R^{1a}$, $R^{2a}$, and $X^-$ are the same as defined above; and x and y are the same as or different from each other, each representing an integer of 0 to 4, with x+y=4; and alkyl ether group-containing trialkyl ammonium salts represented by formula (IIA-2):

[Formula 3]

$$(R^{5a})_3 \overset{\oplus}{N} \quad X^{\ominus}$$
$$\underset{(R^{6a})_z-O-R^{7a}}{|}$$

wherein $R^{5a}$ is a C1 to C6 alkyl group; $R^{6a}$ is a C1 to C6 divalent hydrocarbon group; $R^{7a}$ is a C1 to C4 alkyl group; z is 1 or 2; and $X^-$ is an anion.

The anion $X^-$ may be an inorganic anion or an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

Among these, $BF_4^-$, $PF_6^-$, $AsF_6^-$, and $SbF_6^-$ are preferred in terms of favorable oxidation resistance and ionic dissociation.

Specific suitable examples of the tetraalkyl quaternary ammonium salts include $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, and $Et_3MeNC_4F_9SO_3$. Particularly, $Et_4NBF_4$, $Et_4NPF_6$, $Et_4NSbF_6$, $Et_4NAsF_6$, $Et_3MeNBF_4$, and N,N-diethyl-N-methyl-N-(2-methoxyethyl)ammonium salt are preferred.

(IIB) Spiro-Bipyridinium Salts

The preferred examples of the ammonium salts also include spiro-bipyridinium salts represented by formula (IIB):

[Formula 4]

wherein $R^{8a}$ and $R^{9a}$ are the same as or different from each other, each representing a C1 to C4 alkyl group; $X^-$ is an anion; n1 is an integer of 0 to 5; and n2 is an integer of 0 to 5. Also, those spiro-bipyridinium salts which contain fluorine atoms and/or C1 to C4 fluorine-containing alkyl groups substituted for part or the whole of hydrogen atoms are also preferred in terms of improving the oxidation resistance.

Specific preferred examples of the anion $X^-$ are the same defined for the compound (IIA).

For example,

[Chem. 5]

is one of the specific preferred examples.

This spiro-bipyridinium salt has excellent solubility, oxidation resistance, and ion conductivity.

(IIC) Imidazolium Salt

The preferred examples of the ammonium salts also include imidazolium salts represented by formula (IIC):

[Chem. 6]

$$R^{11a} \overset{\oplus}{\underset{N}{\diagup}} \overset{\diagdown}{\underset{N}{\diagdown}} R^{10a} \quad X^{\ominus}$$

wherein $R^{10a}$ and $R^{11a}$ are the same as or different from each other, each representing a C1 to C6 alkyl group; and $X^-$ is an anion. Also, those imidazolium salts which contain fluorine atoms and/or C1 to C4 fluorine-containing alkyl groups substituted for part or the whole of hydrogen atoms are also preferred in terms of improving the oxidation resistance.

Specific preferred examples of the anion X– are the same as defined for the salts (IIA).

For example,

[Chem. 7]

$$H_3C \diagdown \overset{\oplus}{\underset{N}{\diagup}} \diagdown \underset{N}{\diagdown} \diagup C_2H_5 \quad X^{\ominus}$$

is one of the specific preferred examples.

This imidazolium salt is excellent in terms of having low viscosity and favorable solubility.

(IID) N-Alkyl Pyridinium Salt

The preferred examples of the ammonium salts also include N-alkyl pyridinium salts represented by formula (IID):

[Chem. 8]

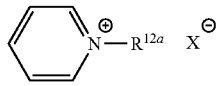

wherein $R^{12a}$ is a C1 to C6 alkyl group; and $X^-$ is an anion. Also, those N-alkyl pyridinium salts which contain fluorine atoms and/or C1 to C4 fluorine-containing alkyl groups substituted for part or the whole of hydrogen atoms are also preferred in terms of improving the oxidation resistance.

Specific preferred examples of the anion $X^-$ are the same as defined for the salts (IIA).

For example,

[Chem. 9]

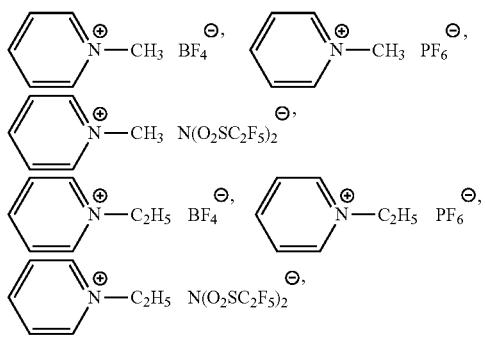

are some of the specific preferred examples.

These N-alkyl pyridinium salts are excellent in terms of having low viscosity and favorable solubility.

(IIE) N,N-Dialkyl Pyrrolidinium Salts

The preferred examples of the ammonium salts also include N,N-dialkyl pyrrolidinium salts represented by the following formula:

[Chem. 10]

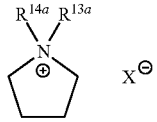

wherein $R^{13a}$ and $R^{14a}$ are the same as or different from each other, each representing a C1 to C6 alkyl group; and $X^-$ is an anion. Also, those N,N-dialkyl pyrrolidinium salts which contain fluorine atoms and/or C1 to C4 fluorine-containing alkyl groups substituted for part or the whole of hydrogen atoms are also preferred in terms of improving the oxidation resistance.

Specific preferred examples of the anion $X^-$ are the same as defined for the salts (IIA).

For example,

[Chem. 11]

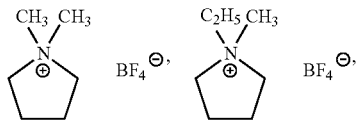

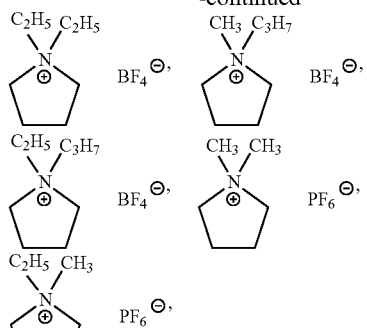

[Chem. 12]

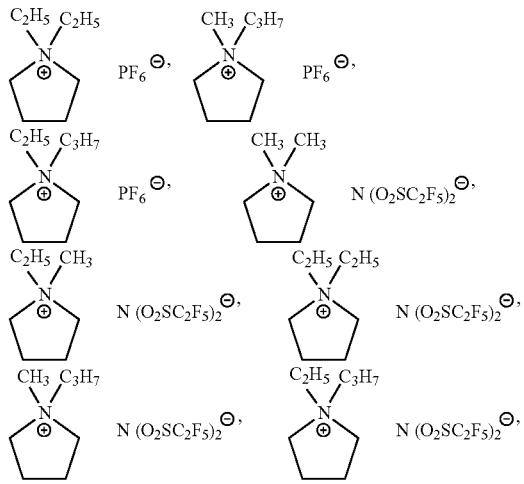

are some of the specific preferred examples.

These N,N-dialkyl pyrrolidinium salts are excellent in terms of having low viscosity and favorable solubility.

Among these ammonium salts, the salts (IIA), (IIB), and (IIC) are preferred for favorable solubility, oxidation resistance, and ion conductivity. More preferred are

[Chem. 13]

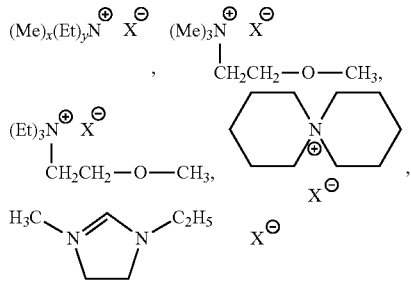

wherein Me is a methyl group; Et is an ethyl group; $X^-$ is the same as defined for formula (ITA); and x and y are the same as defined for formula (IIA-1).

Here, the electrolyte salt may be a lithium salt. Examples of the lithium salt include $LiPF_6$, $LiBF_4$, $LiAsF_6$, $LiSbF_6$, and $LiN(SO_2C_2H_5)_2$.

For larger capacity, a magnesium salt may be used. The magnesium salt is, for example, preferably $Mg(ClO_4)_2$ or $Mg(OOC_2H_5)_2$.

Among these, spiro-bipyridinium tetraborate, triethyl methyl ammonium tetraborate, or tetraethyl ammonium tetraborate is preferred in terms of maintaining low-temperature properties.

In the case of applying the non-aqueous electrolyte solution of the present invention to an electric double layer capacitor, the concentration of the electrolyte salt (II) in the non-aqueous electrolyte solution is different depending on the conditions including the required current density, the intended use, and the electrolyte used. Still, the concentration is preferably 0.3 mol/L or higher, more preferably 0.5 mol/L or higher, and particularly preferably 0.8 mol/L or higher, and is also preferably 3.6 mol/L or lower, more preferably 2.0 mol/L or lower, and particularly preferably 1.6 mol/L or lower.

(I) Compound

The compound (I) is at least one compound selected from the group consisting of fluorinated linear sulfones and fluorinated linear sulfonic acid esters, and is used as a solvent component for non-aqueous electrolyte solutions. The compound (I) is preferably a compound represented by formula (1):

[Chem. 14]

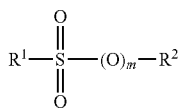
(1)

wherein m is 0 or 1, $R^1$ and $R^2$ are the same as or different from each other, each representing C1 to C7 alkyl or fluorine-containing alkyl group, and at least one of $R^1$ and $R^2$ is a fluorine-containing alkyl group.

In formula (1), the case with m being 1 shows that a sulfur atom and $R^2$ are bonded via an oxygen atom, and the case with m being 0 shows that a sulfur atom and $R^2$ are directly bonded to each other.

$R^1$ and $R^2$ each are preferably a C1 to C6 chain or branched-chain alkyl group or a C1 to C4 chain or branched-chain fluorine-containing alkyl group, and more preferably —$CH_3$, —$C_2H_5$, —$C_3H_7$, —$C_4H_9$, —$C_5H_{11}$, —$C_6H_{13}$, —$CF_3$, —$C_2F_5$, —$CH_2CF_3$, —$CF_2CF_2H$, —$CH_2CF_2CF_3$, —$CH_2CF_2CF_2H$, —$CH_2CF_2CFH_2$, —$CF_2CH_2CF_3$, —$CF_2CHFCF_3$, —$CF_2CF_2CF_3$, —$CF_2CF_2CF_2H$, —$CH_2CF_2CF_3$, —$CH_2CF_2CF_2H$, —$CH_2CF_2CFH_2$, —$CH_2CF_2CH_3$, —$CH_2CHCF_2H$, —$CH_2CFHCFH_2$, or —$CH_2CFHCH_3$. $R^1$ and $R^2$ each are still more preferably —$CH_3$, —$C_2H_5$, —$C_4H_9$, —$CH_2CF_3$, —$CF_2CHFCF_3$, —$CH_2CF_2CF_3$, or —$CH_2CF_2CF_2H$.

Among the compounds represented by formula (1), preferred are compounds represented by formula (1'):

[Chem. 15]

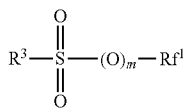
(1')

wherein m is 0 or 1, $R^3$ is a C1 to C7 alkyl group, and $Rf^1$ is a C1 to C7 fluorine-containing alkyl group.

Preferred examples of $R^3$ in formula (1') are the same as the preferred examples of $R^1$ and $R^2$ in the above formula (1) in the case that $R^1$ and $R^2$ each are a C1 to C7 alkyl group. Also, the preferred examples of $Rf^1$ are the same as the preferred examples of $R^1$ and $R^2$ in the above formula (1) in the case that $R^1$ and $R^2$ each are a C1 to C7 fluorine-containing alkyl group.

Specific examples of the compound represented by formula (1) include $HCF_2CF_2CH_2OSO_2CH_3$, $HCF_2CF_2CH_2OSO_2CH_2CH_3$, $CF_3CH_2OSO_2CH_3$, $CF_3CH_2OSO_2CH_2CH_3$, $CF_3CF_2CH_2OSO_2CH_3$, and $CF_3CF_2CH_2OSO_2CH_2CH_3$.

Also,

[Chem. 16]

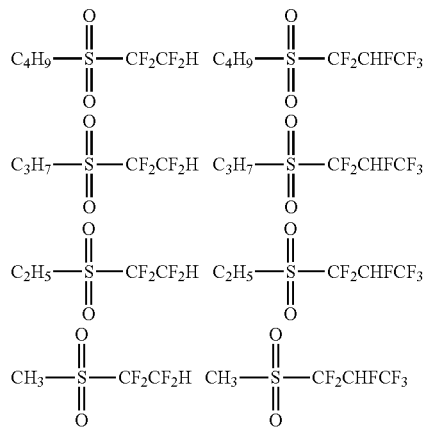

are some specific examples of the compounds represented by formula (1).

Each of these compounds (I) may be used alone, or two or more of these may be used in combination.

Among these compounds represented by formula (1), compounds represented by formula (1) wherein m is 1, that is, compounds represented by the following formula (1-1):

[Chem. 17]

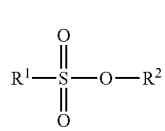
(1-1)

(wherein $R^1$ and $R^2$ are respectively the same as $R^1$ and $R^2$ in formula (1)) are typically synthesized through reaction between a hydroxy group-containing compound (compound (A)) represented by

(2-1)

(wherein $R^2$ is the same as $R^2$ in formula (1)) and a compound represented by formula (2-2):

(2-2)

(wherein $R^1$ is the same as $R^1$ in formula (1)). Such a method of producing a compound represented by formula (1), including a process of synthesizing a compound represented by formula (1) through reaction between a hydroxy group-containing compound represented by formula (2-1) and a compound represented by formula (2-2), is one aspect of the present invention.

In the above synthesis process, one or two or more compounds may be employed for each of a hydroxy group-containing compound represented by formula (2-1) and a compound represented by formula (2-2).

In the above synthesis process, different blending ratios between the hydroxy group-containing compound represented by formula (2-1) and the compound represented by formula (2-2) can be employed for different combinations of those compounds used. Still, the blending ratio is preferably 1/1 to 1.2/1, and more preferably 1/1 to 1.06/1 in a molar ratio between the hydroxy group-containing compound represented by formula (2-1) and the compound represented by formula (2-2).

In the above synthesis process, the reaction temperature is preferably 0° C. to 25° C. If the reaction temperature is lower than 0° C., the rate of reaction may be low. If the reaction temperature is higher than 25° C., the rate of reaction will be high, but the safety level may be lower.

The synthesis process may be performed with or without a solvent. Still, in the case that synthesized compound (1) is purified for use as described below, the synthesis process is preferably performed using a nonsolvent system without a solvent, in consideration of the purification process. In this way, in a preferred embodiment of the present invention, the method of producing a compound represented by formula (1) in the present invention is performed using a nonsolvent system. The nonsolvent system in the present invention encompasses a reaction system including a compound (solvent component) capable of functioning as a solvent in an amount that does not allow the compound to serve as a solvent. In other words, the nonsolvent system encompasses not only a reaction system with substantially no solvent component, but also a reaction system with a compound that is capable of functioning as a solvent and reacts with a substance in the reaction system (i.e., is not inert in the reaction system), such as a neutralizer described below. That is, the term "nonsolvent system" in the present invention means that the reaction system includes substantially no compound that has only a function as a solvent (i.e., is inert in the reaction system).

Specifically, the term "nonsolvent system" shows that the amount of the compound having only a function as a solvent is 1% by mass or less in 100% by mass of a hydroxy group-containing compound represented by formula (2-1). As described below, in another preferred embodiment of the present invention, the synthesis process is performed by adding a neutralizer. In the case of performing the synthesis process in a nonsolvent system by adding a neutralizer, the amount of the solvent component other than the neutralizer is preferably 1% by mass or less in 100% by mass of the hydroxy group-containing compound represented by formula (2-1).

Examples of the compound having only a function as a solvent (i.e., being inert in the reaction system) include tetrahydrofuran (THF), dioxane, diglyme, triglyme, and tetraglyme.

Since the above synthesis process includes reacting a hydroxy group-containing compound represented by formula (2-1) and a compound represented by formula (2-2) which produces a by-product including hydrochloric acid, the process preferably employs a neutralizer for neutralizing the by-product including hydrochloric acid. Neutralizing the by-product such as hydrochloric acid in the reaction system enables prevention of decomposition of the target product and reaction materials.

The neutralizer may be any neutralizer capable of neutralizing a by-product including hydrochloric acid, such as a primary amine, a secondary amine, and a tertiary amine. Preferred neutralizers among these include pyridine, diethylamine, and triethylamine.

Each of these neutralizers may be used alone, or two or more of these may be used in combination.

The amount of the neutralizer to be used is preferably 1 to 1.2 equivalents based on the number of moles of the hydroxy group-containing compound represented by formula (2-1). If the amount of the neutralizer to be used is in such a range, decomposition of the target product and reaction materials can be sufficiently prevented. The amount of the neutralizer to be used is more preferably 1 to 1.16 equivalents.

As mentioned above, the method of producing a compound represented by formula (1) according to the present invention includes a process of synthesizing a compound represented by formula (1) through reaction between a hydroxy group-containing compound represented by formula (2-1) and a compound represented by formula (2-2). Depending on the way of purification, the method may actually leave as an impurity the compound (A) (raw material) or a sulfonic group-containing compound (compound (B)) represented by formula (2-3):

$$R^1SO_3H \quad (2\text{-}3)$$

(wherein $R^1$ is the same as $R^1$ of formula (1)) which is produced through reaction between a compound represented by formula (2-2) and protons.

In this way, since the compounds (A) and (B) are impurities produced through synthesis of a compound represented by formula (1-1), $R^2$ of formula (2-1) is the same as $R^2$ of formula (1-1). Similarly, $R^1$ of formulas (2-2) and (2-3) is the same as $R^1$ of formula (1-1).

For example, $HCF_2CF_2CH_2OSO_2CH_3$, which is a specific preferred example of a compound represented by formula (1), is synthesizable through reaction between $HCF_2CF_2CH_2OH$ and $CH_3SO_2Cl$. Depending on the way of purification, the method may actually leave, as impurities, $HCF_2CF_2CH_2OH$ (compound (A-1)) which is the raw material and $CH_3SO_3H$ (compound (B-1)) which is produced through reaction between $CH_3SO_2Cl$ and protons.

As described above, the individual structures of the compounds (A) and (B) are determined by the structure of a compound represented by formula (1). The impurities in the case of employing the following compound as the compound represented by formula (1) are therefore the compounds described below.

(In the case that the compound represented by formula (1) is $HCF_2CF_2CH_2OSO_2CH_2CH_3$)

The compound (A-1) and $CH_3CH_2SO_3H$ (compound (B-2)) may remain as impurities.

(In the case that the compound represented by formula (1) is $CF_3CH_2OSO_2CH_3$)

$CF_3CH_2OH$ (compound (A-2)) and the compound (B-1) may remain as impurities.

(In the case that the compound represented by formula (1) is $CF_3CH_2OSO_2CH_2CH_3$)

The compound (A-2) and the compound (B-2) may remain as impurities.

(In the case that the compound represented by formula (1) is $CF_3CF_2CH_2OSO_2CH_3$)

$CF_3CF_2CH_2OH$ (compound (A-3)) and the compound (B-1) may remain as impurities.

(In the case that the compound represented by formula (1) is $CF_3CF_2CH_2OSO_2CH_2CH_3$)

The compound (A-3) and the compound (B-2) may remain as impurities.

The compounds (A) and (B) are impurities that can be remained when a compound represented by formula (1) is synthesized. The total amount of the compounds (A) and (B) in the non-aqueous electrolyte solution is preferably 5000 ppm or less relative to the compound represented by formula (1). If the total amount of the compounds (A) and (B) relative to the compound represented by formula (1) is more than 5000 ppm, the discharge characteristics after high-temperature storage may decrease, and the level of cycle degradation may be high when high voltage is applied. Particularly in the case that the compound (A) is remained, the capacity tends to decrease because the compound (A) easily reacts with Li. Also, the compound (B), being a strong acid, may decompose the electrolyte solution. Since the HOMO energy of the compounds (A) and (B) determined by molecular orbital calculation is higher than that of the compound represented by formula (1), the compounds (A) and (B) have low oxidation resistance. The compounds (A) and (B) are therefore decomposed under high voltage, which is considered to be a factor of deterioration. For this reason, smaller amounts of the compounds (A) and (B) in the non-aqueous electrolyte solution are considered to cause a smaller decrease in the retention properties of the cell.

The total amount of the compounds (A) and (B) is preferably 3500 ppm or less, and more preferably 2500 ppm or less, relative to the compound represented by formula (1) in the non-aqueous electrolyte solution.

Preliminarily purifying the compound represented by formula (1) enables to bring the amounts of the compounds (A) and (B) in the above range.

Here, ppm is based on weight; for example, an amount of 5000 ppm or less relative to the compound represented by formula (1) shows that the amount is 0.5 parts by weight or less for each 100 parts by weight of the compound represented by formula (1).

The method of producing the compound represented by formula (1) according to the present invention preferably includes, after the synthesis process of synthesizing the compound represented by formula (1), a purification process of purifying the compound represented by formula (1). The purification process may be any process typically employed as a purification process for a compound, such as liquid separation, distillation, fractional distillation, and filtration. A preferred purification process is, for example, a process of purifying, after liquid separation, a layer containing the compound represented by formula (1), using a distillation column with a height equivalent to the number of theoretical stages of 5 or more.

Also, among the compounds represented by formula (1), a compound represented by the following formula (3):

[Chem. 18]

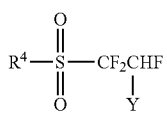

(3)

(wherein $R^4$ is a C1 to C7 alkyl group, and Y is a C1 to C5 alkyl or fluorine-containing alkyl group) is a novel compound which can be produced by the following method.

That is, the production method includes a process of reacting, in the presence of a base, a thiol represented by formula (3-1):

$R^4$—SH   (3-1)

(wherein $R^4$ is the same as defined above) and a fluoroolefin represented by the following formula:

(wherein Y is the same as defined above);
a process of producing a fluorine-containing thioether represented by formula (3-2):

[Chem. 19]

(3-2)

(wherein $R^4$ and Y are the same as defined above); and
a process of reacting the fluorine-containing thioether with an oxidizing agent to produce a fluorine-containing sulfone represented by formula (3-3):

[Chem. 20]

(3-3)

(wherein $R^4$ and Y are the same as defined above).

The base for used in the above production process is preferably at least one selected from the group consisting of alkali metal hydroxides and alkaline earth metal hydroxides. The oxidizing agent is preferably at least one selected from the group consisting of organic peroxides, halogen peroxides, permanganate, chromate, trifluoroacetic acid, and acetic acid.

The non-aqueous electrolyte solution of the present invention contains the compound (I) and the electrolyte salt (II), and may further contain solvent(s) other than the compound (I) as solvent component(s) for non-aqueous electrolyte solutions. In the case that the non-aqueous electrolyte solution of the present invention contains solvent(s) other than the compound (I) as solvent component(s) for non-aqueous electrolyte solutions, the amount of the compound (I) in a solvent (the compound (I) and solvent(s) other than the compound (I)) for non-aqueous electrolyte solutions is preferably 0.01 to 20 vol %. That is, an increase in the amount of the compound (I) (component (I)) in the solvent for non-aqueous electrolyte solutions is likely to decrease the discharge capacity, and the maximum amount of the compound (I) acceptable when the decrease is considered is 20 vol %. The component (I) can exert its effects even when used in a comparatively small amount. The amount is more preferably 10 vol % or less. The minimum amount is more preferably 0.1 vol %, and still more preferably 0.5 vol %.

The compound (I), particularly $HCF_2CF_2CH_2OSO_2CH_3$, forms a favorable coating film especially on the negative electrode, thereby reducing the resistance. Accordingly, in the case of using a carbonaceous material such as graphite for the negative electrode, the amount of the compound (I) is particularly 5 vol % or less in the solvent for non-aqueous electrolyte solutions. Also in the case of employing an alloy material for the negative electrode, the negative electrode shows large expansion and contraction, and thus requires a more stable coating film than negative electrodes made of a carbonaceous material. Hence, the amount of the compound (I) is preferably 20 vol % or less in the solvent for nonaqueous electrolyte solutions. If the amount of the compound (I) is less than 0.01 vol % in the solvent for non-aqueous electrolyte solutions, the amount is too small, and therefore the effect of preventing production of gas is not likely to be achieved. If the amount is more than 20 vol %, on the other hand, the conductivity is deteriorated, which leads to a decrease in the discharge capacity.

Preferred compounds as the solvent(s) other than the compound (I) to be contained in the non-aqueous electrolyte solution of the present invention are a non-fluorinated cyclic carbonate (III) and anon-fluorinated chain carbonate (IV).

That is, a non-aqueous electrolyte solution containing the solvent for non-aqueous electrolyte solutions of the present invention described below, and the electrolyte salt (II) is yet another preferred embodiment of the present invention.

(III) Non-Fluorinated Cyclic Carbonate

Among non-fluorinated cyclic carbonates, ethylene carbonate (EC), vinylene carbonate (VC), and propylene carbonate (PC) are preferred as the solvent components for non-aqueous solutions of the present invention because these carbonates have high dielectric constant and particularly favorable dissolving power for the electrolyte salt. In the case that a graphite material is used for the negative electrode, a stable film can be formed on the negative electrode. Here, the non-fluorinated cyclic carbonate can also be, for example, butylene carbonate or vinyl ethylene carbonate. Particularly, the non-fluorinated cyclic carbonate is preferably at least one selected from the group consisting of ethylene carbonate, propylene carbonate, and butylene carbonate, in terms of the dielectric constant and viscosity. More preferably, the non-fluorinated cyclic carbonate is at least one selected from the group consisting of ethylene carbonate and propylene carbonate. Each of these non-fluorinated cyclic carbonates may be used alone, or two or more of these may be used.

(IV) Non-Fluorinated Chain Carbonate

The non-fluorinated chain carbonate may be, for example, one or two or more of hydrocarbon chain carbonates such as $CH_3CH_2OCOOCH_2CH_3$ (diethyl carbonate: DEC). $CH_3CH_2OCOOCH_3$ (ethyl methyl carbonate: EMC), $CH_3OCOOCH_3$ (dimethyl carbonate: DMC), $CH_3OCOOCH_2CH_2CH_3$ (methyl propyl carbonate), and $CH_3CH_2CH_2OCOOCH_2CH_2CH_3$ (di-n-propyl carbonate). Among these, DEC, EMC, and DMC are preferred because they have a high boiling point, low viscosity, and favorable low-temperature properties. That is, in yet another preferred embodiment of the present invention, the non-fluorinated chain carbonate (IV) is at least one selected from the group consisting of dimethyl carbonate, ethyl methyl carbonate, and diethyl carbonate. Each of these non-fluorinated chain carbonates may be used alone, or two or more of these may be used.

The non-aqueous electrolyte solution, in the case of containing the non-fluorinated chain carbonate, can achieve effects of, for example, better load characteristics attributed to low-temperature properties and decreased viscosity.

If the non-aqueous electrolyte solution contains too large an amount of the non-fluorinated cyclic carbonate (III), the compatibility of the solvent with other components may decrease, leading to phase separation from the other components especially at low temperatures (e.g., at −30° C. to −20° C.) such as outside temperatures in winter and temperatures in a freezer. From this viewpoint, the maximum amount of the non-fluorinated cyclic carbonate (III) is preferably 50 vol %, more preferably 40 vol %, still more preferably 35 vol %, and particularly preferably 30 vol %, of the solvent for non-aqueous electrolyte solutions. Meanwhile, too small an amount tends to decrease the solubility of the electrolyte salt of the entire solvent, failing to achieve the desired electrolyte concentration (0.8 mol/L or higher). The minimum amount is preferably 5 vol %, and more preferably 10 vol %, in terms of improving the load characteristics and cycle characteristics of the lithium-ion secondary battery.

In the case of adding the non-fluorinated chain carbonate (IV), the maximum amount of the carbonate (IV) to be added is preferably 94.9 vol %, and more preferably 89.9 vol % in the solvent for non-aqueous electrolyte solutions. An amount in the above range is preferred in terms of the viscosity and dielectric constant. Meanwhile, the minimum amount is preferably 44.9 vol %.

From the viewpoints described above, the solvent for non-aqueous electrolyte solutions which is to be used for the non-aqueous electrolyte solution of the present invention, in the case of containing the components (III), (IV), and (I), preferably contains 5 to 50 vol % of the component (III), 44.9 to 94.9 vol % of the component (IV), and 0.1 to 20 vol % of the component (I), with the components (III), (IV), and (I) constituting 100 vol % of the solvent. More preferably, the solvent contains 5 to 40 vol % of the component (III), 44.9 to 89.9 vol % of the component (IV), and 0.1 to 10 vol % of the component (I).

The present invention also relates to the solvent for non-aqueous electrolyte solutions mentioned above. That is, another aspect of the present invention is a solvent for non-aqueous electrolyte solutions, including: (I) at least one compound selected from the group consisting of fluorinated linear sulfones and fluorinated linear sulfonic acid esters; (III) a non-fluorinated cyclic carbonate; and (IV) a non-fluorinated chain carbonate, the solvent containing 5 to 50 vol % of the component (III), 44.9 to 94.9 vol % of the component (IV), and 0.1 to 20 vol % of the component (I), with the components (III), (IV), and (I) constituting 100 vol % of the solvent.

Although the solvent for non-aqueous electrolyte solutions can provide solution to the problems to be solved by the present invention as long as containing the components (III), (IV), and (I), the solvent may also include other solvent(s) well-known as solvent(s) for non-aqueous electrolyte solutions, in addition to the components (III), (IV), and (I). Still, the kind and amount of the other solvent(s) should be in a range that does not badly affect the solution to the problems to be solved by the present invention.

The other solvent(s) may be, for example, at least one solvent selected from the group consisting of fluorine-containing carbonates, fluorine-containing ethers, fluorine-containing esters, fluorine-containing lactones, fluoroamides, non-fluorinated ethers, and non-fluorinated esters. The other solvent(s) preferably include(s) at least one solvent selected from the group consisting of fluorine-containing ethers and fluorine-containing carbonates, in terms of the oxidation resistance.

(Fluorine-Containing Carbonates)

Examples of the fluorine-containing carbonates include fluorine-containing chain carbonates and fluorine-containing cyclic carbonates.

A preferred example of the fluorine-containing chain carbonate is, for example, a fluorine-containing carbonate represented by formula (4):

$$Rf^2OCOORf^3 \qquad (4)$$

(wherein $Rf^2$ and $Rf^3$ are the same as or different from each other, each representing a C1 to C4 fluorine-containing alkyl group) because it has high fire retardancy and favorable rate characteristics and oxidation resistance.

Examples of $Rf^2$ and $Rf^3$ include —$CF_3$, —$CF_2CF_3$, —CH

CF$_2$CFHCF$_2$CH$_2$—. Among these, CF$_3$CH$_2$— and C$_2$F$_5$CH$_2$— are particularly preferred because they have high fire retardancy and favorable rate characteristics and oxidation resistance.

Specifically, the fluorine-containing chain carbonate is, for example, one or two or more of fluorine-containing chain carbonates including CF$_3$CH$_2$OCOOCH$_2$CF$_3$, CF$_3$CF$_2$CH$_2$OCOOCH$_2$CF$_2$CF$_3$, CF$_3$CF$_2$CH$_2$OCOOCH$_3$, and CF$_3$CH$_2$OCOOCH$_3$. Among these, CF$_3$CH$_2$OCOOCH$_2$CF$_3$ and CF$_3$CF$_2$CH$_2$OCOOCH$_2$CF$_2$CF$_3$ are particularly preferred because they have suitable viscosity, favorable fire retardancy, favorable compatibility with the other solvents, and favorable rate characteristics. The compounds mentioned in documents such as JP 06-21992 A, JP 2000-327634 A, and JP 2001-256983 A can also be used.

In the case of adding a fluorine-containing chain carbonate, the effect of improving the oxidation resistance is expected.

The fluorine-containing cyclic carbonate is, for example, represented by the following formula (5):

[Chem. 21]

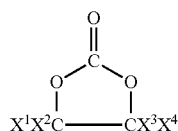

(5)

(wherein X$^1$ to X$^4$ are the same as or different from each other, each representing —H, —F, —CF$_3$, —CF$_2$H, —CFH$_2$, —CF$_2$CF$_3$, —CH$_2$CF$_3$, or —CH$_2$OCH$_2$CF$_2$CF$_3$; here, at least one of X$^1$ to X$^4$ is —F, —CF$_3$, —CF$_2$CF$_3$, —CH$_2$CF$_3$, or —CH$_2$OCH$_2$CF$_2$CF$_3$.

X$^1$ to X$^4$ each are —H, —F, —CF$_3$, —CF$_2$H, —CFH$_2$, —CF$_2$CF$_3$, —CH$_2$CF$_3$, or —CH$_2$OCH$_2$CF$_2$CF$_3$. In terms of favorable dielectric constant and viscosity, and excellent compatibility with the other solvents, —F, —CF$_3$, and —CH$_2$CF$_3$ are preferred.

In formula (5), if at least one of X$^1$ to X$^4$ is —F, —CF$_3$, —CF$_2$CF$_3$, —CH$_2$CF$_3$, or —CH$_2$OCH$_2$CF$_2$CF$_3$, then only one of X$^1$ to X$^4$, or two or more of X$^1$ to X$^4$ may be substituted by —H, —F, —CF$_3$, —CF$_2$H, —CFH$_2$, —CF$_2$CF$_3$, —CH$_2$CF$_3$, or —CH$_2$OCH$_2$CF$_2$CF$_3$. In terms of favorable dielectric constant and oxidation resistance, the number of sites of substitutions is 1 or 2.

If the non-aqueous electrolyte solution contains a fluorine-containing cyclic carbonate, the non-aqueous electrolyte solution of the present invention preferably contains 40 vol % or less of the carbonate. If the amount of the fluorine-containing cyclic carbonate is more than 40 vol %, the viscosity decreases, and thus the rate characteristics tend to be deteriorated. The amount of the fluorine-containing cyclic carbonate is more preferably 30 vol % or less, and still more preferably 10 vol % or less, in terms of favorable rate characteristics. The minimum amount is preferably 3 vol %, and more preferably 5 vol %, in terms of favorable oxidation resistance.

Among the fluorine-containing cyclic carbonates, the following fluorine-containing cyclic carbonates are preferred for improving properties as the lithium-ion secondary battery in the present invention, regarding achievement of excellent properties such as a high dielectric constant and high withstand voltage, and favorable solubility of the electrolyte salt and reduction in the internal resistance.

For example,

[Chem. 22]

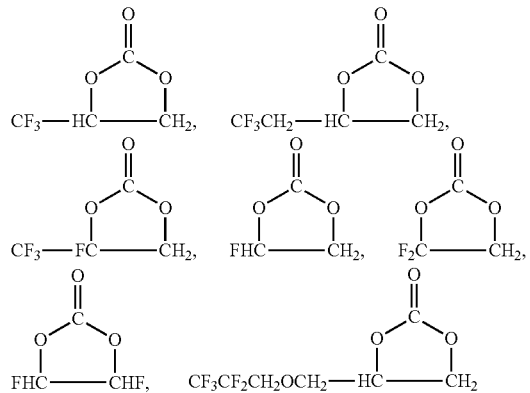

are some of the fluorine-containing cyclic carbonates with high withstand voltage and favorable solubility of the electrolyte salt.

Also,

[Chem. 23]

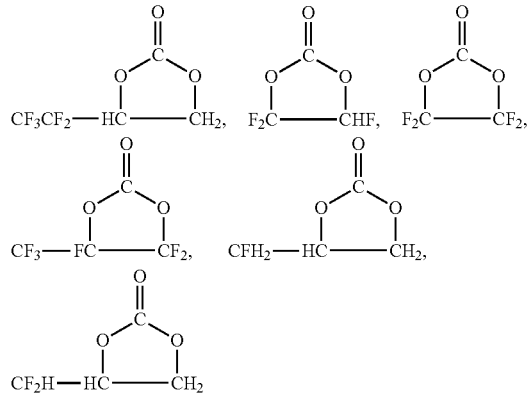

can be used as the fluorine-containing cyclic carbonates.

A fluorine-containing cyclic carbonate can exert the effects of increasing the dielectric constant and achieving better oxidation resistance and ion conductivity.

(Fluorine-Containing Ethers)

A fluorine-containing ether increases the stability and safety under high temperature and high voltage.

Examples of the fluorine-containing ethers include compounds represented by the following formula (6):

$$Rf^4—O—Rf^5 \qquad (6)$$

(wherein Rf$^4$, and Rf$^5$ are the same as or different from each other, each representing a C1 to C10 alkyl group or a C1 to C10 fluorine-containing alkyl group; and at least one of these is a fluorine-containing alkyl group). Here, if the solvent for non-aqueous electrolyte solutions according to the present invention contains a fluorine-containing ether, the total amount of the following compounds (A') and (B'), which are impurities of the fluorine-containing ether, is preferably 5000 ppm or less relative to the fluorine-containing ether.

(A') Fluorine-containing unsaturated compound (hereinafter, also referred to as a compound (A'))

(B') Hydroxy group-containing compound (hereinafter, also referred to as a compound (B')) represented by formula (6-1):

$$Rf^4OH \quad (6\text{-}1)$$

wherein $Rf^4$ is the same as defined for formula (6).

Specific examples of the fluorine-containing ether include $HCF_2CF_2OCH_2CF_2CF_2H$, $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)OCF_2CFHCF_3$, $HCF_2CF_2OCH(C_2H_5)_2$, $HCF_2CF_2OC_4H_9$, $HCF_2CF_2OCH_2CH(C_2H_5)_2$, and $HCF_2CF_2OCH_2CH(CH_3)_2$. Particularly, $HCF_2CF_2CH_2OCF_2CF_2H$, $CF_3CF_2CH_2OCF_2CF_2H$, $HCF_2CF_2OCH_2CF_2CF_2H$, $HCF_2CF_2CH_2OCF_2CFHCF_3$, and $CF_3CF_2CH_2OCF_2CFHCF_3$ are preferred in terms of their high compatibility, low resistance in the case of being used in an electrolyte solution, and oxidation resistance. $HCF_2CF_2OCH_2CF_2CF_2H$ is more preferred.

The fluorine content of the fluorine-containing ether used in the present invention is preferably 50% by mass or more for favorable oxidation resistance and safety. The fluorine content is particularly preferably 55 to 66% by mass. The fluorine content is calculated from the structural formula.

If a fluorine-containing ether is used, the non-aqueous electrolyte solution of the present invention preferably contains 60 vol % or less of the fluorine-containing ether. If the amount of the fluorine-containing ether is more than 60 vol %, the compatibility decreases, and thus the rate characteristics tend to be deteriorated. The amount of the fluorine-containing ether is more preferably 45 vol % or less, and still more preferably 40 vol % or less, in terms of compatibility. The minimum amount is 5 vol %, and more preferably 10 vol %, in terms of favorable oxidation resistance and safety.

The fluorine-containing unsaturated compound (A') is derived from a by-product that is produced through synthesis of a fluorine-containing ether represented by formula (6). Specifically, the compound (A') has an unsaturated bond that is formed when hydrogen fluoride (HF) is eliminated from the fluorine-containing ether represented by formula (6). More specifically, examples of the fluorine-containing unsaturated compound (A') include (A'-1) $CF_2=CFCH_2OCF_2CF_2H$, (A'-2) $HCF_2CF=CHOCF_2CF_2H$, (A'-3) $CF_2=CFCH_2OCF_2CFHCF_3$, (A'-4) $HCF_2CF_2CH_2OCF=CFCF_3$, (A'-5) $HCF_2CF_2CH_2OCF_2CF=CF_2$, and (A'-6) $HCF_2CF=CHOCF_2CFHCF_3$.

Also, the hydroxy group-containing compound (B') is derived from the material used in the synthesis of the fluorine-containing ether represented by formula (6), and is represented by formula (6-1):

$$Rf^4OH \quad (6\text{-}1)$$

wherein $Rf^4$ may be the same as defined for formula (6). Specific examples of the hydroxy group-containing compound (B') include (B'-1) $HCF_2CF_2CH_2OH$.

Specifically preferred are a combination in which the fluorine-containing ether represented by formula (6) is $HCF_2CF_2CH_2OCF_2CF_2H$, the fluorine-containing unsaturated compound (A') is
(A'-1) $CF_2=CFCH_2OCF_2CF_2H$ and
(A'-2) $HCF_2CF=CHOCF_2CF_2H$, and
the hydroxy group-containing compound (B') is
(B'-1) $HCF_2CF_2CH_2OH$; or
a combination in which the fluorine-containing ether represented by formula (6) is $HCF_2CF_2CH_2OCF_2CFHCF_3$, the fluorine-containing unsaturated compound (A') is (A'-3) $CF_2=CFCH_2OCF_2CFHCF_3$,
(A'-4) $HCF_2CF_2CH_2OCF=CFCF_3$,
(A'-5) $HCF_2CF_2CH_2OCF_2CF=CF_2$, and
(A"-6) $HCF_2CF=CHOCF_2CFHCF_3$, and
the hydroxy group-containing compound (B') is
(B'-1) $HCF_2CF_2CH_2OH$.

The compounds (A') and (B') are impurities contained in a fluorine-containing ether. Consequently, if a fluorine-containing ether represented by formula (6) is used, the amounts of the compounds (A') and (B') in the non-aqueous electrolyte solution can be brought to values in the above range (values that make a total amount of 5000 ppm or less relative to the fluorine-containing ether) by preliminarily purifying the fluorine-containing ether.

Here, ppm is based on weight; for example, an amount of 5000 ppm or less relative to a fluorine-containing ether shows that the amount is 0.5 parts by weight or less for each 100 parts by weight of the fluorine-containing ether.

The maximum total amount of the compounds (A') and (B') are more preferably 3500 ppm or less, and still more preferably 2000 ppm or less, relative to the fluorine-containing ether. If the total amount of the compounds (A') and (B') is larger than 5000 ppm and the discharge characteristics after high-temperature storage decrease or show higher voltages, the level of cycle degradation may be high. Among these compounds (A') and (B'), the compound (B') easily reacts with Li. The compound (B'), if remaining in the non-aqueous electrolyte solution, therefore tends to reduce the capacity. Also, the fluorine-containing unsaturated compound (A') having a double bond tends to, if remaining in a large amount, easily react with moisture in the electrolyte solution to be decomposed.

In the present invention, the non-aqueous electrolyte solution preferably contains the compound represented by formula (1) and the compound represented by formula (6) because such a solution enables production of a cell with high oxidation resistance and high safety.

(Fluorine-Containing Esters)

For the fluorine-containing ester, a fluorine-containing ester represented by formula (7):

$$Rf^6COORf^7 \quad (7)$$

(wherein $Rf^6$ is a C1 or C2 fluorine-containing alkyl group, and $Rf^7$ is a C1 to C4 fluorine-containing alkyl group) is preferred because it has high fire retardancy and favorable compatibility with other solvent(s) and oxidation resistance.

Examples of $Rf^6$ include $CF_3—$, $CF_3CF_2—$, $HCF_2CF_2—$, $HCF_2—$, $CH_3CF_2—$, and $CF_3CH_2—$. Among these, $CF_3—$ and $CF_3CF_2—$ are particularly preferred in terms of favorable rate characteristics.

Examples of $Rf^7$ include $—CF_3$, $—CF_2CF_3$, $—CH(CF_3)_2$, $—CH_2CF_3$, $—CH_2CH_2CF_3$, $—CH_2CF_2CFHCF_3$, $—CH_2C_2F_5$, $—CH_2CF_2CF_2H$, $—CH_2CH_2C_2F_5$, $—CH_2CF_2CF_3$, and $—CH_2CF_2CF_2CF_3$. Among these, $—CH_2CF_3$, $—CH(CF_3)_2—CH_2C_2F_5$, and $—CH_2CF_2CF_2H$ are particularly preferred because they have favorable compatibility with other solvent(s).

Specifically, the fluorine-containing ester may be, for example, one or two or more of $CF_3C(=O)OCH_2CF_3$, $CF_3C(=O)OCH_2CH_2CF_3$, $CF_3C(=O)OCH_2C_2F_5$, $CF_3C(=O)OCH_2CF_2CF_2H$, and $CF_3C(=O)OCH(CF_3)_2$. Among these, $CF_3C(=O)OCH_2C_2F_5$, $CF_3C(=O)OCH_2CF_2CF_2H$, $CF_3C(=O)OCH_2CF_3$, and $CF_3C(=O)OCH(CF_3)_2$ are particularly preferred because they have favorable compatibility with other solvent(s) and rate characteristics.

If the non-aqueous electrolyte solution contains a fluorine-containing ester, the effect of increasing the oxidation resistance is expected.

(Fluorine-Containing Lactones)

Examples of the fluorine-containing lactone include fluorine-containing lactones represented by formula (8):

[Chem. 24]

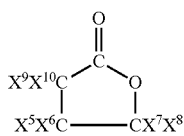
(8)

wherein $X^5$ to $X^{10}$ are the same as or different from each other, each representing —H, —F, —Cl, —CH$_3$, or a fluorine-containing alkyl group; and at least one of $X^5$ to $X^{10}$ is a fluorine-containing alkyl group.

Examples of the fluorine-containing alkyl group in $X^5$ to $X^{10}$ include —CFH$_2$, —CF$_2$H, —CF$_3$, —CH$_2$CF$_3$, —CF$_2$CF$_3$, —CH$_2$CF$_2$CF$_3$, and —CF(CF$_3$)$_2$. —CH$_2$CF$_3$ and —CH$_2$CF$_2$CF$_3$ are preferred because they have high oxidation resistance and provide an effect of improving the safety.

If at least one of $X^5$ to $X^{10}$ is a fluorine-containing alkyl group, then only one of $X^5$ to $X^{10}$, or two or more of $X^5$ to $X^{10}$ may be substituted by —H, —F, —Cl, —CH$_3$, or a fluorine-containing alkyl group. In terms of favorable solubility of the electrolyte salt, the number of sites of substitutions is preferably any one of 1 to 3, and more preferably 1 or 2.

The substitution site for the fluorine-containing alkyl group is not limited, but is preferably a site where $X^7$ and/or $X^8$, particularly $X^7$ or $X^8$, is a fluorine-containing alkyl group, particularly —CH$_2$CF$_3$ or —CH$_2$CF$_2$CF$_3$. $X^5$ to $X^{10}$, if not being a fluorine-containing alkyl group, each are —H, —F, —Cl, or —CH$_3$, and is preferably —H is in terms of favorable solubility of the electrolyte salt.

The examples of the fluorine-containing lactone include, in addition the ones represented by the above formula (8), fluorine-containing lactones represented by formula (9):

[Chem. 25]

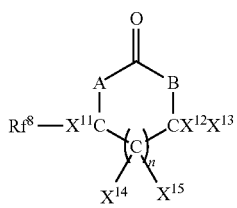
(9)

wherein one of A and B is $CX^{16}X^{17}$ (where $X^{16}$ and $X^{17}$ are the same as or different from each other, each representing —H, —F, —Cl, —CF$_3$, —CH$_3$, or an alkylene group which may have a halogen atom substituted for a hydrogen atom and may contain a hetero atom in its chain), and the other is an oxygen atom; $Rf^8$ is a fluorine-containing alkyl or fluoroalkoxy group which may have an ether bond; $X^{11}$ and $X^{12}$ are the same as or different from each other, each representing —H, —F, —Cl, —CF$_3$, or —CH$_3$; $X^{13}$ to $X^{15}$ are the same as or different from each other, each representing —H, —F, —Cl, or an alkyl group which may have a halogen atom substituted for a hydrogen atom and may contain a hetero atom in its chain; and n=0 or 1).

Preferred examples of the fluorine-containing lactones represented by formula (9) include ones having a five-membered structure represented by formula (10):

[Chem. 26]

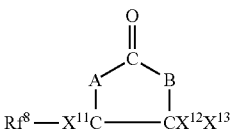
(10)

(wherein A, B, $Rf^9$, $X^{11}$, $X^{12}$, and $X^{13}$ are the same as defined for formula (9)) which can be easily synthesized and have favorable chemical stability. Also, the preferred examples include fluorine-containing lactones represented by formula (11):

[Chem. 27]

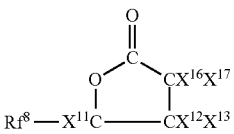
(11)

(wherein $Rf^8$, $X^{11}$, $X^{12}$, $X^{13}$, $X^{16}$, and $X^{17}$ are the same as defined for formula (9)), and fluorine-containing lactones represented by formula (12):

[Chem. 28]

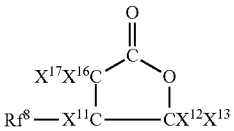
(12)

(wherein $Rf^8$, $X^{11}$, $X^{12}$, $X^{13}$, $X^{16}$, and $X^{17}$ are the same as defined for formula (9)).

For especially achieving excellent properties such as high dielectric constant and high withstand voltage, and improving properties as the electrolyte solution in the present invention in terms of favorable solubility of the electrolyte salt and favorable reduction in the internal resistance,

[Chem. 29]

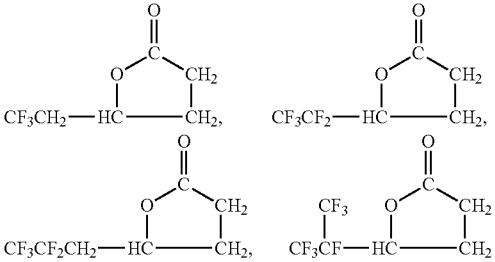

are preferred.

Also,

[Chem. 30]

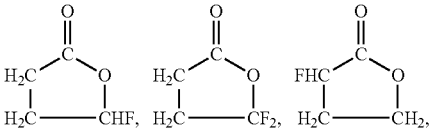

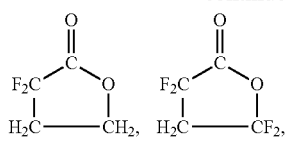

can be used.

A fluorine-containing lactone can achieve the effects of improving the ion conductivity, safety, and stability at high temperatures.

(Fluoroamides)

A fluoroamide is a compound represented by formula (13):

[Chem. 31]

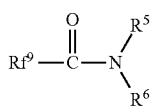
(13)

wherein $Rf^9$ is —$CF_3$, —$CF_2CF_3$, a fluorophenyl group, or a fluorine-containing alkyl phenyl group, and $R^5$ and $R^6$ are the same as or different from each other, each representing a C1 to C8 alkyl group.

The fluorophenyl group preferably contains 1 to 5 fluorine atoms, and particularly preferably 3 to 5 fluorine atoms, for favorable oxidation resistance. Preferred examples of the fluorine-containing alkyl group of the fluorine-containing alkyl phenyl group include —$CF_3$, —$C_2F_5$, and —$HC(CF_3)_2$, and —$CF_3$ and —$C_2F_5$ which have favorable compatibility and low viscosity.

Specific examples of $R^5$ and $R^6$ include —$CH_3$, —$C_2H_5$, —$C_3H_7$, and —$C_4H_9$. Among these, —$CH_3$ and —$C_2H_5$ which have low viscosity are preferred.

The following compounds are particularly preferred as the fluoroamide.

[Chem. 32]

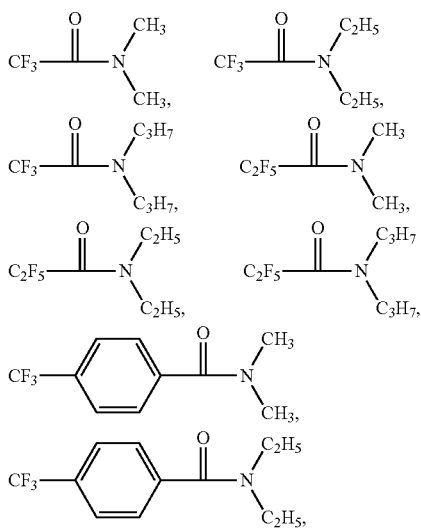

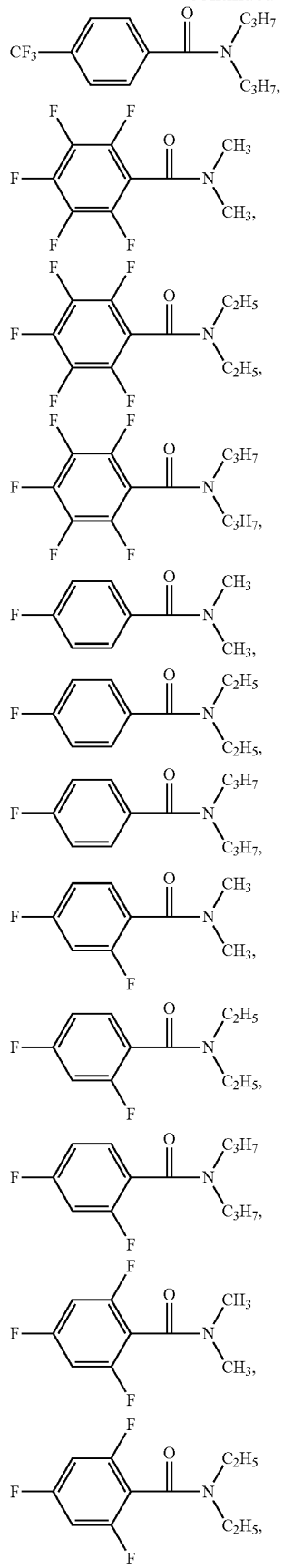

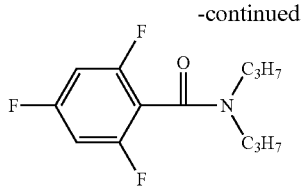

The non-aqueous electrolyte solution of the present invention may contain 10 vol % or less of a fluoroamide. If the amount of the fluoroamide is more than 10 vol %, the viscosity tends to increases, and the ion conductivity tends to decreases. The amount of the fluoroamide is preferably 6 vol % or less, for favorable stability under high temperature and high voltage even when the viscosity is decreased. The amount is more preferably 3 vol % or less, for especially favorable stability under high temperature and high voltage. The minimum amount is preferably 0.01 vol %, and more preferably 0.05 vol %, in terms of stability under high temperature and high voltage.

(Non-Fluorinated Ether)

Preferred examples of the non-fluorinated ether include cyclic ethers such as tetrahydrofuran and 2-methyltetrahydrofuran; and chain ethers such as dimethoxyethane and dimethoxymethane.

(Non-Fluorinated Esters)

A non-fluorinated ester provides an effect of increasing the rate characteristics. Preferred examples of the non-fluorinated ester include cyclic carboxylate ester compounds such as γ-butyrolactone and γ-valerolactone; and chain carboxylate ester compounds such as an acetate ester, a propionate ester, and a butyrate ester. The amount for addition is preferably 30 vol % or less, and more preferably 20 vol % or less, to ensure the compatibility with the electrolyte salt. The minimum amount is preferably 1 vol %, and more preferably 3 vol %.

One preferred example of the solvent(s) other than the compound (I) is a solvent which includes 20 to 45 vol % of the non-fluorinated cyclic carbonate (III) and 55 to 80 vol % of the non-fluorinated chain carbonate (IV). Such a solvent is preferably used as the solvent(s) other than the compound (I) because the solvent increases the electric conductivity of the electrolyte solution, leading to an increase in the cycle characteristics and in the large-current discharge characteristics.

Another preferred example of the solvent(s) other than the compound (I) is a solvent which includes 60 vol % or more, more preferably 85 vol %, of an organic solvent selected from ethylene carbonate, propylene carbonate, γ-butyrolactone, and γ-valerolactone. An electrolyte solution containing such a solvent as the solvent(s) other than the compound (I) and a lithium salt as the electrolyte salt causes a small amount of evaporation of the solvent and a small amount of liquid leakage even when used at high temperatures. Particularly, a solvent including 5 to 45 vol % of ethylene carbonate and 55 to 95 vol % of γ-butyrolactone, and a solvent including 30 to 60 vol % of ethylene carbonate and 40 to 70 vol % of propylene carbonate are preferred because these solvents achieve good balance between the cycle characteristics and large-current discharge characteristics.

Yet another preferred example of the solvent(s) other than the compound (I) is a solvent which includes 10 vol % or more of a phosphorus-containing organic solvent. Examples of the phosphorus-containing organic solvent include trimethyl phosphate, triethyl phosphate, dimethyl ethyl phosphate, methyl diethyl phosphate, ethylene methyl phosphate, and ethylene ethyl phosphate. Such a solvent can decrease the combustibility of the electrolyte solution. For good balance between the cycle characteristics and large-current discharge characteristics, the electrolyte solution preferably contains a solvent, including 10 to 80 vol % of the phosphorus-containing organic solvent and other solvent component(s) mainly selected from γ-butyrolactone, γ-valerolactone, a non-fluorinated cyclic carbonate, and a non-fluorinated chain carbonate, and a lithium salt as its electrolyte salt.

Yet another preferred example of the solvent(s) other than the compound (I) is a solvent which includes 8 vol % or less, preferably 0.01 to 8 vol %, of a cyclic carbonate ester with a carbon-carbon unsaturated bond in a molecule. Such a solvent including a cyclic carbonate ester with a carbon-carbon unsaturated bond in a molecule in the above range prevents the compound (I) from causing a side reaction at the negative electrode, and further improves the storage characteristics and the cycle characteristics of the cell. If the amount of the cyclic carbonate ester is more than 8 vol %, the battery performance after storage may decrease or gas is produced to increase the internal pressure of the cell. The minimum amount is more preferably 0.1 vol %, and the maximum is more preferably 3 vol %.

Examples of the cyclic carbonate ester having a carbon-carbon unsaturated bond in a molecule include vinylene carbonate compounds such as vinylene carbonate, methyl vinylene carbonate, ethyl vinylene carbonate, 4,5-dimethylvinylene carbonate, 4,5-diethylvinylene carbonate, fluorovinylene carbonate, and trifluoromethylvinylene carbonate; and vinyl ethylene carbonates such as 4-vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, 4,5-divinylethylene carbonate, 4,4-dimethyl-5-methylene ethylene carbonate, and 4,4-diethyl-5-methylene ethylene carbonate. Among these, vinylene carbonate, 4-vinylethylene carbonate, 4-methyl-4-vinylethylene carbonate, and 4,5-divinylethylene carbonate are preferred, and particularly vinylene carbonate and 4-vinylethylene carbonate are preferred. Two or more of these may be used in combination.

The non-aqueous electrolyte solution of the present invention may include other additive(s) such as anti-fire agents (fire retardants), surfactants, high-permittivity additives, improvers for cycle characteristics and rate characteristics, overcharge inhibitors, dehydrating agents, and deoxidizers.

Examples of the anti-fire agents (fire retardants), added to improve incombustibility or fire retardancy, include phosphate esters.

Examples of the phosphate esters include fluorine-containing alkyl phosphate esters, non-fluorinated alkyl phosphate esters, and aryl phosphate esters. Among these, fluorine-containing alkyl phosphate esters are preferred because they highly contribute to incombustibility of the electrolyte solution, and achieve the anti-fire effect even when used in a small amount.

Examples of the fluorine-containing alkyl phosphate esters include the fluorine-containing dialkyl phosphate ester described in JP H11-233141 A, the cyclic alkyl phosphate ester described in JP H11-283669 A, and fluorine-containing trialkyl phosphate esters.

For improving the fire retardancy, a fire retardant such as $(CH_3O)_3P=O$ and $(CF_3CH_2O)_3P=O$ can also be added.

A surfactant may be blended in order to improve the capacitance characteristics and rate characteristics.

The surfactant may be any of a cationic surfactant, an anionic surfactant, a nonionic surfactant, and an amphoteric surfactant, but a fluorine-containing surfactant is preferred for favorable cycle characteristics and rate characteristics.

Preferred examples of the surfactant include fluorine-containing carboxylate salts represented by formula (14):

$$Rf^{10}COO^-M^+ \quad (14)$$

(wherein $Rf^{10}$ is a fluorine-containing alkyl group which may have a C3 to C10 ether bond; and $M^+$ is $Li^+$, $Na^+$, $K^+$, or $NHR'_3{}^+$ (wherein R's are the same as or different from each other, each representing H or a C1 to C3 alkyl group)); and fluorine-containing sulfonate salts represented by formula (15):

$$Rf^{11}SO_3{}^-M^+ \quad (15)$$

(wherein $Rf^{11}$ is a fluorine-containing alkyl group which may have a C3 to C10 ether bond; and $M^+$ is $Li^+$, $Na^+$, $K^+$, or $NHR'_3{}^+$ (wherein R's are the same as or different from each other, each representing H or a C1 to C3 alkyl group)).

The amount of the surfactant to be added is preferably 0.01 to 2% by mass of the non-aqueous electrolyte solution of the present invention in terms of decreasing the surface tension of the electrolyte solution without decreasing the charge and discharge cycle characteristics.

Examples of the high-permittivity additives include sulfolane, methyl sulfolane, γ-butyrolactone, γ-valerolactone, acetonitrile, and propionitrile.

Examples of the overcharge inhibitors include aromatic compounds such as cyclohexylbenzene, biphenyl, alkyl biphenyl, terphenyl, a partial hydroxide of terphenyl, t-butylbenzene, t-amyl benzene, diphenyl ether, benzofuran, and dibenzofuran; partially or fully fluorinated compounds of aromatic compounds such as 2-fluoro biphenyl, hexafluorobenzene, and fluorobenzene; fluorine-containing anisole compounds such as 2,4-difluoroanisole, 2,5-difluoroanisole, and 2,6-difluoroanisole; dichloroaniline, and toluene.

If the non-aqueous electrolyte solution includes 0.1 to 5 vol % of these overcharge inhibitors, burst and ignition of the cell can be prevented when the cell is overcharged.

Examples of the improvers for cycle characteristics and rate characteristics include methyl acetate, ethyl acetate, tetrahydrofuran, and 1,4-dioxane.

Also, the following additives may be used: carbonate compounds such as fluoroethylene carbonate, trifluoropropylene carbonate, phenylethylene carbonate, and erythritan carbonate; carboxylic anhydrides such as succinic anhydride, glutaric anhydride, maleic anhydride, citraconic anhydride, glutaconic anhydride, itaconic anhydride, diglycolic anhydride, cyclohexane dicarboxylic anhydride, cyclopentane tetracarboxylic dianhydride, and phenyl succinic anhydride; sulfur-containing compounds such as ethylene sulfite, 1,3-propanesultone, 1,4-butanesultone, methyl methane sulfonate, busulfan, sulfolane, sulfolene, dimethyl sulfone, and tetramethylthiuram monosulfide; nitrogen-containing compounds such as 1-methyl-2-pyrrolidinone, 1-methyl-2-piperidone, 3-methyl-2-oxazolidinone, 1,3-dimethyl-2-imidazolidinone, and N-methyl succinimide; and hydrocarbon compounds such as heptane, octane, and cycloheptane.

If the non-aqueous electrolyte solution contains 0.1 to 5 vol % of these additives, the capacity maintenance characteristics and cycle characteristics after high-temperature storage are favorable.

The non-aqueous electrolyte solution of the present invention described above can be used for an electrolytic capacitor, an electric double layer capacitor, a cell chargeable/dischargeable by charge-transfer of ions, a solid-state display element such as electroluminescence, and a sensor such as a current sensor and a gas sensor. The non-aqueous electrolyte solution is preferably used for lithium-ion secondary batteries. Such a lithium-ion secondary battery including the non-aqueous electrolyte solution of the present invention is also one aspect of the present invention. The present invention also relates to an electric double layer capacitor provided with the non-aqueous electrolyte solution of the present invention.

The lithium-ion secondary battery of the present invention includes a positive electrode, a negative electrode, and the non-aqueous electrolyte solution of the present invention.

The positive electrode includes a positive electrode mixture containing the positive electrode active material which is a material of a positive electrode, and a charge collector.

The positive electrode active material is particularly preferably a lithium-containing transition metal complex oxide which provides high voltage.

Examples of the lithium-containing transition metal complex oxide include spinel-type lithium manganese complex oxides represented by formula: $Li_aMn_{2-b}M^1{}_bO_4$, wherein $0.9 \leq a$, $0 \leq b \leq 1.5$, and $M^1$ is at least one metal selected from the group consisting of Fe, Co, Ni, Cu, Zn, Al, Sn, Cr, V, Ti, Mg, Ca, Sr, B, Ga, In, Si, and Ge;

lithium nickel complex oxides represented by formula: $LiNi_{1-c}M^2{}_cO_2$, wherein $0 \leq c \leq 0.5$, and $M^2$ is at least one metal selected from the group consisting of Fe, Co, Mn, Cu, Zn, Al, Sn, Cr, V, Ti, Mg, Ca, Sr, B, Ga, In, Si, and Ge; and lithium cobalt complex oxides represented by formula: $LiCo_{1-d}M^3{}_dO_2$, wherein $0 \leq d \leq 0.5$, and $M^3$ is at least one selected from the group consisting of Fe, Ni, Mn, Cu, Zn, Al, Sn, Cr, V, Ti, Mg, Ca, Sr, B, Ga, In, Si, and Ge.

Particularly, for providing a lithium-ion secondary battery with high energy density and high power, $LiCoO_2$, $LiMnO_2$, $LiNiO_2$, $LiMn_2O_4$, $LiNi_{0.8}Co_{0.15}Al_{0.05}O_2$, or $LiNi_{1/3}Co_{1/3}Mn_{1/3}O_2$ is preferably used.

The examples of the positive electrode active material also include $LiFeO_2$, $LiFePO_4$, $LiNi_{0.8}Co_{0.2}O_2$ and $Li_{1.2}Fe_{0.4}Mn_{0.4}O_2$, $LiNi_{0.5}Mn_{0.5}O_2$, $LiV_3O_6$, and $V_2O_5$.

Since high power is required if the lithium-ion secondary battery of the present invention is used as a large lithium-ion secondary battery for hybrid cars or distributed power supplies, the particles of the positive electrode active material are preferred to mainly include aggregated particles.

The particles of the positive electrode active material preferably have an average aggregated particle size of 40 μm or less, and include 0.5 to 7.0 vol % of fine particles that have an average primary particle size of 1 μm or less. If the particles include fine particles with an average primary particle size of 1 μm or less, the contact area with the electrolyte solution can be large, and the diffusion speed of the lithium ions between the electrodes and electrolyte solution can be increased, whereby the output power of the cell can be increased.

The amount of the positive electrode active material is preferably 50 to 99% by mass, and more preferably 80 to 99% by mass, of the positive electrode mixture, in terms of large cell capacity.

The positive electrode mixture preferably further includes a binder, a thickener, and a conducting material.

The binder can be any binder safe for the solvent or electrolyte solution used in production of cells. Examples of such a binder include polyvinylidene fluoride, polytetrafluoroethylene, polyethylene, polypropylene, styrene-butadiene rubber, isoprene rubber, butadiene rubber, ethylene-acrylic acid copolymers, and ethylene-methacrylic acid copolymers.

Examples of the thickener include carboxymethyl cellulose, methyl cellulose, hydroxymethyl cellulose, ethyl cellulose, polyvinyl alcohol, oxidized starch, phosphorylated starch, and casein.

Examples of the conducting material include carbon materials such as graphite and carbon black.

Examples of the material of the charge collector for positive electrodes include metals such as aluminum, titanium, or tantalum, and their alloys. Among these, aluminum or its alloy is preferably used.

The positive electrode may be produced by a conventional method. The method is, for example, adding materials including the above binder, thickener, conducting material, and solvent to the positive electrode active material to produce a positive electrode mixture in a slurry form, applying the mixture to a charge collector, drying the mixture, and pressing the mixture to achieve high density.

A negative electrode includes a negative electrode mixture containing a negative electrode material and a charge collector.

Examples of the negative electrode material include carbonaceous materials capable of absorbing and releasing lithium, such as pyrolysates of organic substances under various pyrolysis conditions, artificial graphite, natural graphite, corks, mesocarbon microbeads, carbon fibers, activated carbon, and pitch-coated graphite; metal oxide materials capable of absorbing and releasing lithium, such as tin oxide and silicon oxide; metal nitride materials capable of absorbing and releasing lithium, such as $Li_{2.6}Co_{0.4}N$; lithium metals; and various lithium alloys. Two or more of these negative electrode materials may be used in combination.

The carbonaceous material capable of absorbing and releasing lithium is preferably artificial graphite or purified natural graphite produced by high-temperature treatment of graphatizable pitches obtained from various materials, or a carbonaceous material obtained by surface-treating the above graphite with an organic material such as a pitch, and carbonizing the treated graphite.

The negative electrode mixture preferably further contains a binder, a thickener, and a conducting material. Examples of the binder include the same agents usable for the binder of the positive electrode.

Examples of the thickener include the same agents usable for the thickener of the positive electrode.

Examples of the conducting material of the negative electrode include metallic materials such as copper and nickel; and carbon materials such as graphite and carbon black.

Examples of the material of the charge collector for negative electrodes include copper, nickel, and stainless steel. Particularly, copper foil is preferred in terms of the processability into a thin film and of the cost.

The negative electrode may be produced by a conventional method. The method is, for example, adding materials including the above binder, thickener, conducting material, and solvent to the negative electrode active material to produce a negative electrode mixture in a slurry form, applying the mixture to a charge collector, drying the mixture, and pressing the mixture to achieve high density.

The lithium-ion secondary battery of the present invention preferably further includes a separator.

The material and shape of the separator are not particularly limited if they are stable in the electrolyte solution and have excellent solution retention properties, and may be known material and shape.

In terms of favorable permeability of the electrolyte solution and shutdown effects, the separator is preferably a porous sheet or a nonwoven fabric made of a polyolefine such as polyethylene and polypropylene. Examples of such a separator include microporous polyethylene films, microporous polypropylene films, microporous ethylene-propylene copolymer films, microporous polypropylene/polyethylene two-layer films, and microporous polypropylene/polyethylene/polypropylene three-layer films.

The shape of the lithium-ion secondary battery of the present invention may have any shape including a cylindrical, a square, a laminate, a coin, and a large size. The shapes and compositions of the positive electrode, the negative electrode, and the separator can be different in different-shaped cells.

Since the non-aqueous electrolyte solution of the present invention is incombustible, the solution is particularly usable as an electrolyte solution for large-sized lithium-ion secondary batteries for hybrid cars or distributed power supplies, and is also usable as a nonaqueous electrolyte solution for small-sized lithium-ion secondary batteries.

A module including the lithium-ion secondary battery of the present invention is also one aspect of the present invention.

In this way, the non-aqueous electrolyte solution of the present invention enables appropriate production of a cell with excellent storage properties at high temperatures and excellent cycle characteristics under high voltage, and a module employing the cell.

EXAMPLES

The present invention will be described based on examples which, however, are not intended to limit the scope of the present invention.

The compounds used in the following examples and comparative examples are listed below.

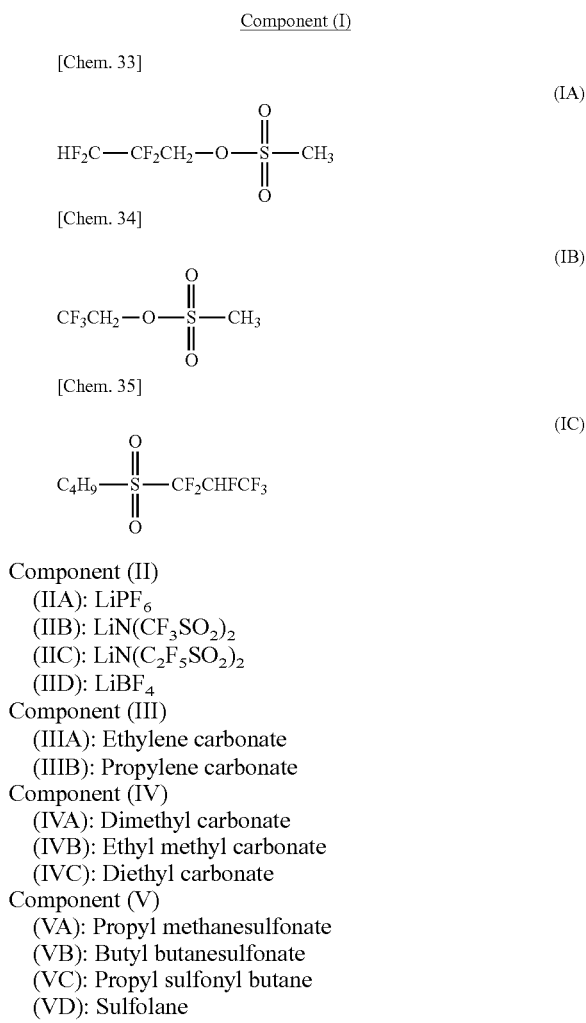

Component (II)
   (IIA): $LiPF_6$
   (IIB): $LiN(CF_3SO_2)_2$
   (IIC): $LiN(C_2F_5SO_2)_2$
   (IID): $LiBF_4$
Component (III)
   (IIIA): Ethylene carbonate
   (IIIB): Propylene carbonate
Component (IV)
   (IVA): Dimethyl carbonate
   (IVB): Ethyl methyl carbonate
   (IVC): Diethyl carbonate
Component (V)
   (VA): Propyl methanesulfonate
   (VB): Butyl butanesulfonate
   (VC): Propyl sulfonyl butane
   (VD): Sulfolane

Example 1

Ethylene carbonate (IIIA) as the component (III), dimethyl carbonate (IVA) as the component (IV), and the compound (IA) as the component (I) were mixed at a ratio of 30/67/3 (vol %). To this solvent for non-aqueous electrolyte solutions was added $LiPF_6$ (IIA) as electrolyte salt (II) to a concentration of 1.0 mol/L, and sufficiently stirred at 25° C. Thereby, a non-aqueous electrolyte solution of the present invention was prepared.

Examples 2 to 9

A non-aqueous electrolyte solution was prepared by the same method as that in Example 1, except that the compounds used as the component (II), component (III), component (IV), and component (I) and the amounts of these compounds used were those shown in Table 1.

Examples 10 to 14

A non-aqueous electrolyte solution was prepared by the same method as that in Example 1, except that the compounds used as the component (II), component (III), component (IV), and component (I) and the amounts of these compounds used were those shown in Table 2.

Comparative Example 1

A non-aqueous electrolyte solution was prepared by the same method as that in Example 1, except that the compounds used as the component (II), component (IV), and component (III) and the amounts of these compounds used were those shown in Table 3, and the component (I) was not used.

Comparative Examples 2 to 5

A non-aqueous electrolyte solution was prepared by the same method as that in Example 1, except that the compounds used as the component (II), component (IV), component (III), and component (V) and the amounts of these compounds used were those shown in Table 3, and the component (I) was not used.

The following Experiment 1 was performed for each of these non-aqueous electrolyte solutions.

Experiment 1 (Measurement of Battery Performance)

Cylindrical secondary batteries were produced by the following method.

A positive electrode active material was produced by mixing $LiCoO_2$, carbon black, and polyvinylidene fluoride (product of KUREHA CORPORATION, trade name: KF-1000) at a ratio of 90/3/7 (% by mass). The positive electrode active material was dispersed in N-methyl-2-pyrrolidone to produce a slurry. The slurry was uniformly applied to a positive electrode current collector (aluminum foil having a thickness of 15 μm) and dried, so that a positive electrode mixture layer was formed. Thereafter, the resulting collector was compression-molded with a roller pressing machine and cut into pieces. A lead was welded to each cut piece, and thereby belt-shaped positive electrodes were produced.

Separately, 6% by mass (solids content) of styrene-butadiene rubber dispersed in distilled water was added to artificial graphite powder, and they were mixed using a disperser into a slurry. The slurry was uniformly applied to a negative electrode collector (copper foil having a thickness of 10 μm) and dried, so that a negative electrode mixture layer was formed. Thereafter, the resulting collector was compression-molded with a roller pressing machine and cut into pieces. The cut pieces were dried, and a lead was welded to each dried piece, whereby belt-shaped negative electrodes were produced.

The belt-shaped positive electrodes were stacked on the respective belt-shaped negative electrodes with a 20-μm-thick microporous polyethylene film (separator) in between. The resulting stacks were coiled to form coil-rolled electrode stacks. Here, the rough surface of the positive electrode current collector faced the outer side when the stack was coiled. The electrode stacks were then put into individual bottom-closed cylindrical cell cases having an outer diameter of 18 mm, and the leads of the positive electrodes and negative electrodes were welded.

Subsequently, the electrolyte solutions prepared in Examples 1 to 14 and Comparative Examples 1 to 5 were poured into the individual cell cases. After the electrolyte solution sufficiently penetrated the separator, the case was closed, preliminarily charged, and aged. Thereby, cylindrical lithium-ion secondary batteries were produced.

The discharge capacity, load characteristics (high-temperature storage characteristics), and cycle characteristics of the lithium-ion secondary batteries were determined by the following procedures. Tables 1 to 3 show the results.

(Discharge Capacity)

The measurement was performed under the following charge and discharge measurement conditions, with a unit C representing the charge and discharge current and 1 C being equivalent to 1800 mA. The evaluation was made based on the result of discharge capacity in Comparative Example 1 which was taken as 100.

Charge and Discharge Conditions

Charge: Maintain 1.0 C and 4.5 V until the charge current reaches 1/10 C (CC/CV charge)

Discharge: 1 C, with 3.0 V cut-off (CC discharge)

(High-Temperature Storage Characteristics)

The cell was charged at 1.0 C and 4.5 V until the charge current reached 1/10 C, and discharged at a current of 0.2 C to 3.0 V, so that the discharge capacity was determined. Thereafter, the cell was charged at 1.0 C and 4.5 V until the charge current reached 1/10 C, and then placed in an 85° C. constant-temperature bath for two days. After the two-day storage, the cell was left to sufficiently cool to room temperature, and was discharged at a current of 0.2 until the voltage reached 3.0 V. The cell was then charged at 1.0 C and 4.5 V until the charge current reached 1/10 C, and was discharged at a current of 0.2 C until the voltage reached 3.0 V, so that the discharge capacity after the storage was determined. The discharge capacity before the storage and the discharge capacity after the storage and discharge at 0.2 C were substituted into the following formula to calculate the high-temperature storage characteristics.

$$\text{High-temperature storage characteristics (\%)} = \frac{\text{Discharge capacity before storage (mAh)}}{\text{Discharge capacity after storage, charge, and discharge (mAh)}} \times 100 \quad [\text{Math. 1}]$$

(Cycle Characteristics)

To determine the cycle characteristics, a charge and discharge cycle under the above charge and discharge conditions (charging at 1.0 C and 4.5 V until the charge current reaches 1/10 C, and discharging at a current of 1 C to 3.0 V) was taken as 1 cycle. The discharge capacity after the first cycle and the discharge capacity after 100 cycles were determined. The cycle characteristics are represented by a cycle retention calculated from the following formula.

$$\text{Cycle retention (\%)} = \frac{\text{100-cycle discharge capacity (mAh)}}{\text{1-cycle discharge capacity (mAh)}} \times 100 \quad [\text{Math. 2}]$$

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Solvent component | | | | | | | | | |
| Component (III) | IIIA | IIIA | IIIA | IIIA | IIIA | IIIA + IIIB | IIIA | IIIA | IIIA |
| Proportion (vol %) | 30 | 30 | 30 | 30 | 30 | 20 + 10 | 30 | 30 | 30 |
| Component (IV) | IVA | IVA | IVA | IVB | IVC | IVA | IVA + IVB | IVA + IVC | IVB + IVC |
| Proportion (vol %) | 67 | 67 | 67 | 67 | 67 | 67 | 30 + 37 | 30 + 37 | 30 + 37 |
| Component (I) | IA | IB | IC | IA | IA | IA | IA | IA | IA |
| Proportion (vol %) | 3 | 3 | 3 | 3 | 3 | 3 | 3 | 3 | 3 |
| Total (vol %) | 100 | 100 | 100 | 100 | 100 | 100 | 100 | 100 | 100 |
| Electrolyte salt | | | | | | | | | |
| Component (IIA) $LiPF_6$ (mol/L) | 1.0 | 1.0 | 1.0 | 1.0 | 1.0 | 1.0 | 1.0 | 1.0 | 1.0 |
| Evaluation result | | | | | | | | | |
| Discharge capacity | 106.9 | 104.5 | 106.9 | 106.0 | 103.0 | 106.0 | 103.0 | 102.1 | 102.0 |
| High-temperature storage characteristics (%) | 90.1 | 88.9 | 90.1 | 89.5 | 88.9 | 89.7 | 89.8 | 89.4 | 89.2 |
| Cycle characteristics (%) | 85.2 | 82.9 | 85.2 | 86.1 | 86.6 | 84.7 | 85.6 | 86.3 | 86.2 |

TABLE 2

|  | Example 10 | Example 11 | Example 12 | Example 13 | Example 14 |
|---|---|---|---|---|---|
| Solvent composition | | | | | |
| Component (III) | IIIA | IIIA | IIIA | IIIA | IIIA |
| Proportion (vol %) | 30 | 30 | 30 | 30 | 30 |
| Component (IV) | IVA | IVA | IVA | IVA | IVA |
| Proportion (vol %) | 67 | 67 | 67 | 69.9 | 50 |
| Component (I) | IA | IA | IA | IA | IA |
| Proportion (vol %) | 3 | 3 | 3 | 0.1 | 20 |
| Total (vol %) | 100 | 100 | 100 | 100 | 100 |
| Electrolyte salt | | | | | |
| Component (II) | IIB | IIC | IID | IIA | IIA |
| Concentration (mol/L) | 1.0 | 1.0 | 1.0 | 1.0 | 1.0 |
| Evaluation result | | | | | |
| Discharge capacity | 103.8 | 102.8 | 101.0 | 103.3 | 101.0 |
| High-temperature storage characteristics (%) | 87.9 | 88.1 | 88.0 | 83.5 | 89.0 |
| Cycle characteristics (%) | 82.6 | 82.8 | 82.7 | 83.5 | 83.6 |

TABLE 3

|  | Comparative Example 1 | Comparative Example 2 | Comparative Example 3 | Comparative Example 4 | Comparative Example 5 |
|---|---|---|---|---|---|
| Solvent composition | | | | | |
| Component (III) | IIIA | IIIA | IIIA | IIIA | IIIA |
| Proportion (vol %) | 30 | 30 | 30 | 30 | 30 |
| Component (IV) | IVC | IVA | IVA | IVA | IVA |
| Proportion (vol %) | 70 | 67 | 67 | 67 | 67 |
| Component (V) | — | VA | VB | VC | VD |
| Proportion (vol %) | — | 3 | 3 | 3 | 3 |
| Total (vol %) | 100 | 100 | 100 | 100 | 100 |
| Electrolyte salt | | | | | |
| Component (IIA) $LiPF_6$ (mol/L) | 1.0 | 1.0 | 1.0 | 1.0 | 1.0 |
| Evaluation result | | | | | |
| Discharge capacity | 100.0 | 99.7 | 99.1 | 99.4 | 98.9 |
| High-temperature storage characteristics (%) | 81.2 | 81.5 | 81.9 | 82.1 | 80.3 |
| Cycle characteristics (%) | 77.5 | 73.1 | 74.3 | 74.1 | 72.8 |

The results in Tables 1 to 3 show that the cells containing the compound (I) have better discharge capacity, high-temperature storage characteristics, and cycle characteristics than the cell in Comparative Example 1 which does not contain the compound (I). The results also show that the cells containing the compound (I) provide greater effects of discharge capacity, high-temperature storage characteristics, and cycle characteristics than the cells in Comparative Examples 2 to 5 in which all the fluorine atoms in the structural formula were substituted by hydrogen atoms.

Also, the results show that the different electrolyte salts (Examples 10 to 12) still provide great effects of discharge capacity, high-temperature storage characteristics, and cycle characteristics. Furthermore, when the amount of the compound (I) was decreased to 0.1 vol % (Example 13) and the amount was increased to 20 vol % (Example 14), the discharge capacity, high-temperature storage characteristics, and cycle characteristics decreased in both cases, but apparently better than those of the cell in Comparative Example 1.

Synthesis Example 1

Synthesis of $HCF_2CF_2CH_2OSO_2CH_3$

A 10-L four-neck flask was equipped with a refluxing pipe and a dropping funnel to serve as a reactor. To the flask were added $HCF_2CF_2CH_2OH$ (445.35 g; 3.37 mol) and pyridine (306.31 g; 3.88 mol) in an ice bath, and the mixture was stirred. Using the dropping funnel, methanesulfonyl chloride (364.15 g; 3.20 mol) was dropped, with care for heat generation. The reaction solution changed its color gradually to milky white as pyridine hydrochloride was produced. After the end of the reaction, the reaction solution was washed with a 1 N HCl aqueous solution. The washed solution was separated to collect an organic layer.

The organic layer was purified through distillation using a ten-stage distillation column. The first drops, which are about 5% of the distillate, were disposed, and almost equivalent amounts of distillates were sampled in the distillation order. Thereby, rectifications A, B, and C with different amounts of $HCF_2CF_2CH_2OH$ (compound (A-1)) and $CH_3SO_3H$ (compound (B-1)) were obtained.

The purity of $HCF_2CF_2CH_2OSO_2CH_3$, and the amounts of the compounds (A-1) and (B-1) based on $HCF_2CF_2CH_2OSO_2CH_3$ were determined by performing gas chromatography (using a product of Shimadzu Corporation, GC-17A; column: DB624 (Length 60, I.D 0.32, Film 1.8 µm); temperature increase from 50° C. to 250° C. at 10° C./min; both injection and detector (FID) at 250° C.) on the rectifications A to C. Table 4 shows the results.

TABLE 4

| | Purity (%) | Amount (ppm) | | Total amount of compounds (A-1), (B-1) (ppm) |
| | | Compound (A-1) | Compound (B-1) | |
| --- | --- | --- | --- | --- |
| Recitification A | 99.13 | 4500 | 3600 | 8100 |
| Recitification B | 99.43 | 2600 | 2100 | 4700 |
| Recitification C | 99.70 | 1300 | 1000 | 2300 |

Synthesis Example 2

Synthesis of $HCF_2CF_2CH_2OSO_2CH_2CH_3$

A 10-L four-neck flask was equipped with a refluxing pipe and a dropping funnel to serve as a reactor. To the flask were added $HCF_2CF_2CH_2OH$ (445.35 g; 3.37 mol) and pyridine (306.31 g; 3.88 mol) in an ice bath, and the mixture was stirred. Using the dropping funnel, ethanesulfonyl chloride (411.4 g; 3.20 mol) was dropped, with care for heat generation. The reaction solution changed its color gradually to milky white as pyridine hydrochloride was produced. After the end of the reaction, the reaction solution was washed with a 1 N HCl aqueous solution. The washed solution was separated to collect an organic layer.

The organic layer was purified through distillation using a ten-stage distillation column. The first drops, which are about 5% of the distillate, were disposed, and almost equivalent amounts of distillates were sampled in the distillation order. Thereby, rectifications D, E, and F with different amounts of $HCF_2CF_2CH_2OH$ (compound (A-1)) and $CH_3CH_2SO_3H$ (compound (B-2)) were obtained.

The purity of $HCF_2CF_2CH_2OSO_2CH_2CH_3$, and the amounts of the compounds (A-1) and (B-2) based on $HCF_2CF_2CH_2OSO_2CH_2CH_3$ were determined by performing gas chromatography (using a product of Shimadzu Corporation, GC-17A; column: DB624 (Length 60, I.D 0.32, Film 1.8 µm); temperature increase from 50° C. to 250° C. at 10° C./min; both injection and detector (FID) at 250° C.) on the rectifications D to F. Table 5 shows the results.

TABLE 5

| | Purity (%) | Amount (ppm) | | Total amount of compounds (A-1), (B-2) (ppm) |
| | | Compound (A-1) | Compound (B-2) | |
| --- | --- | --- | --- | --- |
| Recitification D | 99.08 | 3600 | 4800 | 8400 |
| Recitification E | 99.46 | 1800 | 3000 | 4800 |
| Recitification F | 99.68 | 800 | 1600 | 2400 |

Synthesis Example 3

Synthesis of $CF_3CH_2OSO_2CH_3$

A 10-L four-neck flask was equipped with a refluxing pipe and a dropping funnel to serve as a reactor. To the flask were added $CF_3CH_2OH$ (337.1 g; 3.37 mol) and pyridine (306.31 g; 3.88 mol) in an ice bath, and the mixture was stirred. Using the dropping funnel, methanesulfonyl chloride (364.15 g; 3.20 mol) was dropped, with care for heat generation. The reaction solution changed its color gradually to milky white as pyridine hydrochloride was produced. After the end of the reaction, the reaction solution was washed with a 1 N HCl aqueous solution. The washed solution was separated to collect an organic layer.

The organic layer was purified through distillation using a ten-stage distillation column. The first drops, which are about 5% of the distillate, were disposed, and almost equivalent amounts of distillates were sampled in the distillation order. Thereby, rectifications G, H, and I with different amounts of $CF_3CH_2OH$ (compound (A-2)) and $CH_3SO_3H$ (compound (B-1)) were obtained.

The purity of $CF_3CH_2OSO_2CH_3$ and the amounts of the compounds (A-2) and (B-1) based on $CF_3CH_2OSO_2CH_3$ were determined by performing gas chromatography (using a product of Shimadzu Corporation, GC-17A; column: DB624 (Length 60, I.D 0.32, Film 1.8 µm); temperature increase from 50° C. to 250° C. at 10° C./min; both injection and detector (FID) at 250° C.) on the rectifications G to I. Table 6 shows the results.

TABLE 6

|  | Purity (%) | Amount (ppm) Compound (A-2) | Amount (ppm) Compound (B-1) | Total amount of compounds (A-2), (B-1) (ppm) |
| --- | --- | --- | --- | --- |
| Rectification G | 99.01 | 4800 | 4500 | 9300 |
| Rectification H | 99.48 | 2600 | 2200 | 4800 |
| Rectification I | 99.75 | 1200 | 1000 | 2200 |

Synthesis Example 4

Synthesis of $CF_3CH_2OSO_2CH_2CH_3$

A 10-L four-neck flask was equipped with a refluxing pipe and a dropping funnel to serve as a reactor. To the flask were added $CF_3CH_2OH$ (337.1 g; 3.37 mol) and pyridine (306.31 g; 3.88 mol) in an ice bath, and the mixture was stirred. Using the dropping funnel, ethanesulfonyl chloride (364.15 g; 3.20 mol) was dropped, with care for heat generation. The reaction solution changed its color gradually to milky white as pyridine hydrochloride was produced. After the end of the reaction, the reaction solution was washed with a 1 N HCl aqueous solution. The washed solution was separated to collect an organic layer.

The organic layer was purified through distillation using a ten-stage distillation column. The first drops, which are about 5% of the distillate, were disposed, and almost equivalent amounts of distillates were sampled in the distillation order. Thereby, rectifications J, K, and L with different amounts of $CF_3CH_2OH$ (compound (A-2)) and $CH_3CH_2SO_3H$ (compound (B-2)) were obtained.

The purity of $CF_3CH_2OSO_2CH_2CH_3$ and the amounts of the compounds (A-2) and (B-2) based on $CF_3CH_2OSO_2CH_2CH_3$ were determined by performing gas chromatography (using a product of Shimadzu Corporation, GC-17A; column: DB624 (Length 60, I.D 0.32, Film 1.8 µm); temperature increase from 50° C. to 250° C. at 10° C./min; both injection and detector (FID) at 250° C.) on the rectifications J to L. Table 7 shows the results.

TABLE 7

|  | Purity (%) | Amount (ppm) Compound (A-2) | Amount (ppm) Compound (B-2) | Total amount of compounds (A-2), (B-2) (ppm) |
| --- | --- | --- | --- | --- |
| Rectification J | 99.05 | 3800 | 5400 | 9200 |
| Rectification K | 99.50 | 1400 | 3500 | 4900 |
| Rectification L | 99.73 | 800 | 1700 | 2500 |

Example 15

Under dry argon atmosphere, 3 parts by weight of $HCF_2CF_2CH_2OSO_2CH_3$ of the rectification C was added to 97 parts by weight of a mixture of ethylene carbonate and ethyl methyl carbonate (capacity ratio 3:7). Subsequently, fully dried $LiPF_6$ was dissolved to a ratio of 1 mol/L, whereby an electrolyte solution was produced.
(Production of Coin Cell)

A positive electrode active material was produced by mixing $LiNi_{1/3}Mn_{1/3}Co_{1/3}O_2$, carbon black, and polyvinylidene fluoride (product of KUREHA CORPORATION, trade name KF-7200) at 92/3/5 (% by mass). The positive electrode active material was dispersed in N-methyl-2-pyrrolidone to produce a slurry, whereby a positive electrode mixture slurry was prepared. The obtained positive electrode mixture slurry was applied uniformly to an aluminum charge collector and dried, so that a positive electrode mixture layer (having a thickness of 50 µm) was formed. The resulting collector was compression-molded with a roller pressing machine, and thereby a positive electrode stack was produced.

The positive electrode stack was punched out into a size with a diameter of 1.6 mm to produce a circular positive electrode.

Separately, 6% by mass (solids content) of styrene-butadiene rubber dispersed in distilled water was added to artificial graphite powder, and they were mixed using a disperser into a slurry. The slurry was uniformly applied to a negative electrode collector (copper foil having a thickness of 10 µm) and dried, so that a negative electrode mixture layer was formed. Thereafter, the resulting collector was compression-molded with a roller pressing machine and punched out into a size with a diameter of 1.6 mm. Thereby, a circular negative electrode was produced.

The circular positive electrode was assembled with the negative electrode with a 20-µm-thick microporous polyethylene film (separator) in between. The electrolyte solution was poured into the assembly. After the electrolyte solution sufficiently penetrated the separator, the assembly was sealed, preliminarily charged, and aged. Thereby, a lithium-ion secondary coin battery was produced.
(Measurement of Battery Performance)

The cycle characteristics and high-temperature storage characteristics of the lithium-ion secondary coin battery were determined under high voltage by the following procedure.
Charge and Discharge Conditions Charge: Maintain 0.5 C and 4.3 V until the charge current reaches 1/10 C (CC/CV charge)

Discharge: 0.5 C, with 3.0 V cut-off (CC discharge)
(High-Voltage Cycle Characteristics)

To determine the cycle characteristics, a charge and discharge cycle under the above charge and discharge conditions (charging at 1.0 C and the predetermined voltage until the charge current reaches 1/10 C, and discharging at a current of 1 C to 3.0 V) was taken as 1 cycle. The discharge capacity after the 5 cycles and the discharge capacity after 100 cycles were measured. The cycle characteristics are represented by a capacitance retention calculated from the following formula.

$$\text{Capacity retention (\%)} = \frac{100\text{-cycle discharge capacity (mAh)}}{5\text{-cycle discharge capacity (mAh)}} \times 100 \quad [\text{Math. 3}]$$

(High-Temperature Storage Characteristics)

To determine the high-temperature storage characteristics, the cell was charged and discharged under the above charge and discharge conditions (charging at 1.0 C and the predetermined voltage until the charge current reaches 1/10 C, and discharging at a current of 1 C to 3.0 V). Then, the cell was charged again under the above charge condition, and stored in an 85° C. constant temperature bath for one day. The cell after the storage was discharged under the above discharge condition to a discharge end voltage of 3 V to measure the remaining capacity. The cell was charged again under the above charge condition, and then discharged at the constant current specified in the above discharge condition to a discharge end voltage of 3 V to measure the recovery capacity. Table 8 shows the recovery capacity when the discharge capacity before the storage is taken as 100.

Example 16

A cell was produced and tested in the same manner as in Example 15, except that $HCF_2CF_2CH_2OSO_2CH_3$ of the rectification C was changed to $HCF_2CF_2CH_2OSO_2CH_3$ of the rectification B.

Example 17

A cell was produced and tested in the same manner as in Example 15, except that $HCF_2CF_2CH_2OSO_2CH_3$ of the rectification C was changed to $HCF_2CF_2CH_2OSO_2CH_2CH_3$ of the rectification F.

Example 18

A cell was produced and tested in the same manner as in Example 15, except that $HCF_2CF_2CH_2OSO_2CH_3$ of the rectification C was changed to $HCF_2CF_2CH_2OSO_2CH_2CH_3$ of the rectification E.

Example 19

A cell was produced and tested in the same manner as in Example 15, except that $HCF_2CF_2CH_2OSO_2CH_3$ of the rectification C was changed to $CF_3CH_2OSO_2CH_3$ of the rectification I.

Example 20

A cell was produced and tested in the same manner as in Example 15, except that $HCF_2CF_2CH_2OSO_2CH_3$ of the rectification C was changed to $CF_3CH_2OSO_2CH_3$ of the rectification H.

Example 21

A cell was produced and tested in the same manner as in Example 15, except that $HCF_2CF_2CH_2OSO_2CH_3$ of the rectification C was changed to $CF_3CH_2OSO_2CH_2CH_3$ of the rectification L.

Example 22

A cell was produced and tested in the same manner as in Example 15, except that $HCF_2CF_2CH_2OSO_2CH_3$ of the rectification C was changed to $CF_3CH_2OSO_2CH_2CH_3$ of the rectification K.

Example 23

A cell was produced and tested in the same manner as in Example 15, except that $HCF_2CF_2CH_2OSO_2CH_3$ of the rectification C was changed to $HCF_2CF_2CH_2OSO_2CH_3$ of the rectification A.

Example 24

A cell was produced and tested in the same manner as in Example 15, except that $HCF_2CF_2CH_2OSO_2CH_3$ of the rectification C was changed to a compound obtained by adding $HCF_2CF_2CH_2OH$ (compound (A-1)) to $HCF_2CF_2CH_2OSO_2CH_3$ of the rectification C to a concentration of 10000 ppm.

Example 25

A cell was produced and tested in the same manner as in Example 15, except that $HCF_2CF_2CH_2OSO_2CH_3$ of the rectification C was changed to a compound obtained by adding $CH_3SO_3H$ (compound (B-1)) to $HCF_2CF_2CH_2OSO_2CH_3$ of the rectification C to a concentration of 10000 ppm.

Example 26

A cell was produced and tested in the same manner as in Example 15, except that $HCF_2CF_2CH_2OSO_2CH_3$ of the rectification C was changed to $HCF_2CF_2CH_2OSO_2CH_2CH_3$ of the rectification D.

Example 27

A cell was produced and tested in the same manner as in Example 15, except that $HCF_2CF_2CH_2OSO_2CH_3$ of the rectification C was changed to a compound obtained by adding $CH_3CH_2SO_3H$ (compound (B-2)) to $HCF_2CF_2CH_2OSO_2CH_2CH_3$ of the rectification F to a concentration of 10000 ppm.

Example 28

A cell was produced and tested in the same manner as in Example 15, except that $HCF_2CF_2CH_2OSO_2CH_3$ of the rectification C was changed to $CF_3CH_2OSO_2CH_3$ of the rectification G.

Example 29

A cell was produced and tested in the same manner as in Example 15, except that $HCF_2CF_2CH_2OSO_2CH_3$ of the rectification C was changed to a compound obtained by adding $CF_3CH_2OH$ (compound (A-2)) to $CF_3CH_2OSO_2CH_3$ of the rectification I to a concentration of 10000 ppm.

Example 30

A cell was produced and tested in the same manner as in Example 15, except that $HCF_2CF_2CH_2OSO_2CH_3$ of the rectification C was changed to $CF_3CH_2OSO_2CH_2CH_3$ of the rectification J.

TABLE 8

|  | High-voltage cycle characteristics Capacity retention(%) | High-temperature storage Recovery capacity |
|---|---|---|
| Example 15 | 94.0 | 91.1 |
| Example 16 | 92.9 | 89.5 |
| Example 17 | 92.5 | 90.8 |
| Example 18 | 91.3 | 88.3 |
| Example 19 | 93.1 | 90.6 |
| Example 20 | 92.1 | 90.1 |
| Example 21 | 90.8 | 88.3 |
| Example 22 | 89.8 | 86.5 |
| Example 23 | 85.1 | 80.6 |
| Example 24 | 84.3 | 79.3 |
| Example 25 | 81.4 | 76.1 |
| Example 26 | 83.8 | 77.5 |
| Example 27 | 83.1 | 75.8 |
| Example 28 | 82.5 | 74.3 |
| Example 29 | 80.6 | 73.8 |
| Example 30 | 81.8 | 72.5 |

Comparison between Examples 15 to 22 and Examples 23 to 30 shows that the high-temperature storage characteristics and high-voltage cycle characteristics can be improved when the total amount of the compounds (A-1), (A-2), (B-1), and (B-2) in the solvent for non-aqueous electrolyte solutions is 5000 ppm or less. Particularly, a comparison between Examples 15, 17, 19, and 21 and Examples 16, 18, 20, and 22 shows that the characteristics are further improved when the total amount of the compounds (A-1), (A-2), (B-1), and (B-2) in the solvent for non-aqueous electrolyte solutions is 2500 ppm or less.

Example 31

In a vertical mixing vessel with a stirring blade, ethylene carbonate (EC) and ethyl methyl carbonate (EMC) were first mixed at a volume ratio of EC/EMC=3/7. To the mixture were added 1.0 mol/L of $LiPF_6$, $1 \times 10^{-5}$ mol/kg of $HCF_2CF_2CH_2OSO_2CH_3$ of the rectification C, and $2.5 \times 10^{-5}$ mol/kg of a mixture of polyethylene oxide monool and polyethylene oxide diol (mixing ratio 1:1 (molar ratio), weight average molecular weight 2000) as an additive. Thereby, a non-aqueous electrolyte solution was obtained. Except for using this non-aqueous electrolyte solution, a lithium-ion secondary coin battery was produced and its cycle characteristics and high-temperature storage characteristics were evaluated in the same manner as in Example 15. The determined capacity retention was 92.5% and the determined recovery capacity was 91.0.

Example 32

A cell was produced and tested for evaluation in the same manner as in Example 31, except that $HCF_2CF_2CH_2OSO_2CH_3$ of the rectification C was changed to $HCF_2CF_2CH_2OSO_2CH_2CH_3$ of the rectification F. The determined capacity retention was 91.0% and the determined recovery capacity was 91.5.

Example 33

A cell was produced and tested for evaluation in the same manner as in Example 31, except that $HCF_2CF_2CH_2OSO_2CH_3$ of the rectification C was changed to $CF_3CH_2OSO_2CH_3$ of the rectification I. The determined capacity retention was 92.4% and the determined recovery capacity was 93.3.

Example 34

In a vertical mixing vessel with a stirring blade, ethylene carbonate (EC) and diethyl methyl carbonate (DEC) were first mixed at a volume ratio of EC/DEC=3/7. To the mixture were added 1.0 mol/L of $LiPF_6$, $1 \times 10^{-5}$ mol/kg of $HCF_2CF_2CH_2OSO_2CH_3$ of the rectification C, and $2.5 \times 10^{-5}$ mol/kg of a mixture of polyethylene oxide monool and polyethylene oxide diol (mixing ratio 1:1 (molar ratio), weight average molecular weight 2000) as an additive. Thereby, a non-aqueous electrolyte solution was obtained. Except for using this non-aqueous electrolyte solution, a lithium-ion secondary coin battery was produced and its cycle characteristics and high-temperature storage characteristics were evaluated in the same manner as in Example 15. The determined capacity retention was 90.5% and the determined recovery capacity was 91.4.

Example 35

A cell was produced and tested for evaluation in the same manner as in Example 34, except that $HCF_2CF_2CH_2OSO_2CH_3$ of the rectification C was changed to $HCF_2CF_2CH_2OSO_2CH_2CH_3$ of the rectification F. The determined capacity retention was 93.1% and the determined recovery capacity was 92.5.

Example 36

A cell was produced and tested for evaluation in the same manner as in Example 34, except that $HCF_2CF_2CH_2OSO_2CH_3$ of the rectification C was changed to $CF_3CH_2OSO_2CH_3$ of the rectification I. The determined capacity retention was 91.7% and the determined recovery capacity was 92.3.

Example 37

In a vertical mixing vessel with a stirring blade, ethylene carbonate (EC), propylene carbonate (PC), and ethyl methyl carbonate (EMC) were first mixed at a volume ratio of EC/PC/EMC=2/1/7. To the mixture were added 1.0 mol/L of $LiPF_6$, $1 \times 10^{-5}$ mol/kg of $HCF_2CF_2CH_2OSO_2CH_3$ of the rectification C, and $2.5 \times 10^{-5}$ mol/kg of a mixture of polyethylene oxide monool and polyethylene oxide diol (mixing ratio 1:1 (molar ratio), weight average molecular weight 2000) as an additive. Thereby, a non-aqueous electrolyte solution was obtained. Except for using this non-aqueous electrolyte solution, a lithium-ion secondary coin battery was produced and its cycle characteristics and high-temperature storage characteristics were evaluated in the same manner as in Example 15. The determined capacity retention was 92.4% and the determined recovery capacity was 91.5.

Example 38

A cell was produced and tested for evaluation in the same manner as in Example 37, except that $HCF_2CF_2CH_2OSO_2CH_3$ of the rectification C was changed to $HCF_2CF_2CH_2OSO_2CH_2CH_3$ of the rectification F. The determined capacity retention was 93.4% and the determined recovery capacity was 91.5.

Example 39

A cell was produced and tested for evaluation in the same manner as in Example 37, except that $HCF_2CF_2CH_2OSO_2CH_3$ of the rectification C was changed to $CF_3CH_2OSO_2CH_3$ of the rectification I. The determined capacity retention was 90.7% and the determined recovery capacity was 90.4.

Example 40

In a vertical mixing vessel with a stirring blade, ethylene carbonate (EC), propylene carbonate (PC), and diethyl carbonate (DEC) were first mixed at a volume ratio of EC/PC/DEC=2/1/7. To the mixture were added 1.0 mol/L of $LiPF_6$, $1 \times 10^{-5}$ mol/kg of $HCF_2CF_2CH_2OSO_2CH_3$ of the rectification C, and $2.5 \times 10^{-5}$ mol/kg of a mixture of polyethylene oxide monool and polyethylene oxide diol (mixing ratio 1:1 (molar ratio), weight average molecular weight 2000) as an additive. Thereby, a non-aqueous electrolyte solution was obtained. Except for using this non-aqueous electrolyte solution, a lithium-ion secondary coin battery was produced and its cycle characteristics and high-temperature storage characteristics were evaluated in the same manner as in Example 15.

The determined capacity retention was 91.2% and the determined recovery capacity was 92.4.

Example 41

A cell was produced and tested for evaluation in the same manner as in Example 40, except that $HCF_2CF_2CH_2OSO_2CH_3$ of the rectification C was changed to $HCF_2CF_2CH_2OSO_2CH_2CH_3$ of the rectification F. The determined capacity retention was 93.5% and the determined recovery capacity was 92.0.

Example 42

A cell was produced and tested for evaluation in the same manner as in Example 40, except that $HCF_2CF_2CH_2OSO_2CH_3$ of the rectification C was changed to $CF_3CH_2OSO_2CH_3$ of the rectification I. The determined capacity retention was 91.0% and the determined recovery capacity was 90.7.

The invention claimed is:

1. A non-aqueous electrolyte solution, comprising
   (I) at least one compound selected from the group consisting of fluorinated linear sulfones and fluorinated linear sulfonic acid esters, and
   (II) an electrolyte salt,
   wherein the fluorinated linear sulfonic acid ester is at least one selected from the group consisting of $HCF_2CF_2CH_2OSO_2CH_3$, $HCF_2CF_2CH_2OSO_2CH_2CH_3$, $CF_3CH_2OSO_2CH_2CH_3$, $CF_3CF_2CH_2OSO_2CH_3$, and $CF_3CF_2CH_2OSO_2CH_2CH_3$, and
   the fluorinated linear sulfone is at least one selected from the group consisting of the following compounds:

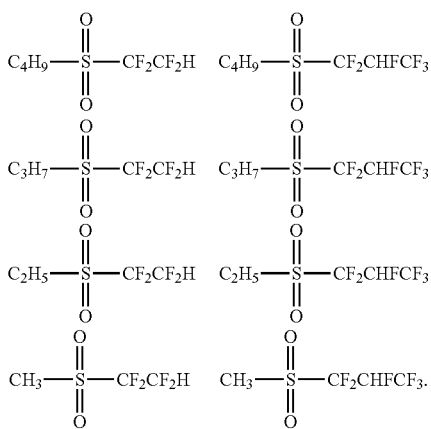

2. The non-aqueous electrolyte solution according to claim 1, further comprising
   (III) a non-fluorinated cyclic carbonate, and
   (IV) a non-fluorinated chain carbonate.

3. A solvent for non-aqueous electrolyte solutions, comprising:
   (I) at least one compound selected from the group consisting of fluorinated linear sulfones and fluorinated linear sulfonic acid esters;
   (III) a non-fluorinated cyclic carbonate; and
   (IV) a non-fluorinated chain carbonate,
   the solvent containing 5 to 50 vol % of the component (III), 44.9 to 94.9 vol % of the component (IV), and 0.1 to 20 vol % of the component (I), with the components (III), (IV), and (I) constituting 100 vol % of the solvent,
   wherein the fluorinated linear sulfonic acid ester is at least one selected from the group consisting of $HCF_2CF_2CH_2OSO_2CH_3$, $HCF_2CF_2CH_2OSO_2CH_2CH_3$, $CF_3CH_2OSO_2CH_2CH_3$, $CF_3CF_2CH_2OSO_2CH_3$, and $CF_3CF_2CH_2OSO_2CH_2CH_3$, and
   the fluorinated linear sulfone is at least one selected from the group consisting of the following compounds:

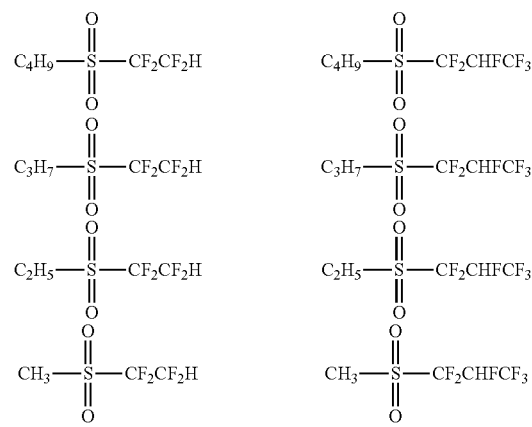

4. A non-aqueous electrolyte solution, comprising
   the solvent according to claim 3, and
   the electrolyte salt (II).

5. The non-aqueous electrolyte solution according to claim 2,
   wherein the non-fluorinated cyclic carbonate (III) is at least one selected from the group consisting of ethylene carbonate, propylene carbonate, and butylene carbonate.

6. The non-aqueous electrolyte solution according to claim 3,
   wherein the non-fluorinated chain carbonate (IV) is at least one selected from the group consisting of dimethyl carbonate, ethyl methyl carbonate, and diethyl carbonate.

7. The non-aqueous electrolyte solution according to claim 1,
   wherein the electrolyte salt (II) is at least one selected from the group consisting of $LiPF_6$, $LiBF_4$, $LiCF_3SO_3$, $LiN(CF_3SO_2)_2$, $LiN(C_2F_5SO_2)_2$, lithium difluoro(oxalato)borate, lithium bis(oxalato)borate, and salts represented by a formula: $LiPF_a(C_nF_{2n+1})_{6-a}$, wherein a is an integer of 0 to 5, and n is an integer of 1 to 6.

8. The non-aqueous electrolyte solution according to claim 1, for lithium-ion secondary batteries.

9. A lithium-ion secondary battery comprising
   the non-aqueous electrolyte solution according to claim 1.

10. A module comprising
    the lithium-ion secondary battery according to claim 9.

11. An electric double layer capacitor comprising
    the non-aqueous electrolyte solution according to claim 1.

12. The non-aqueous electrolyte solution according to claim 1, comprising at least one fluorinated linear sulfone selected from the group consisting of the following compounds:

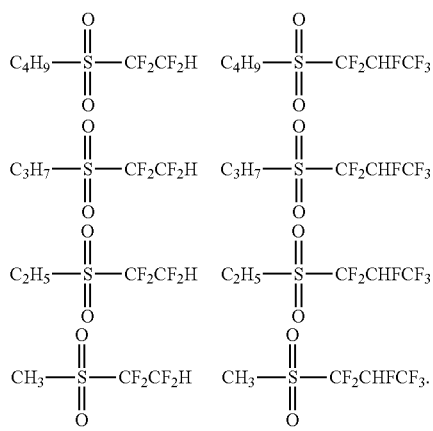

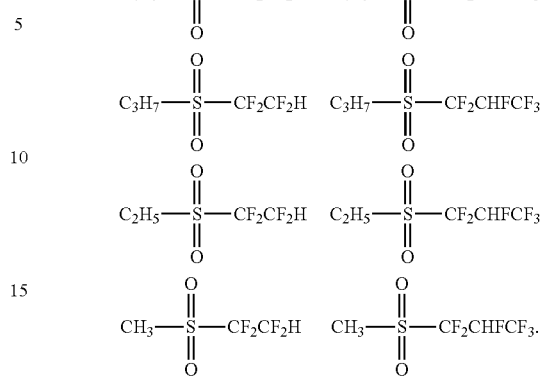

13. The non-aqueous electrolyte solution according to claim 1, comprising at least one fluorinated sulfonic acid ester selected from the group consisting of $HCF_2CF_2CH_2OSO_2CH_3$, $HCF_2CF_2CH_2OSO_2CH_2CH_3$, $CF_3CH_2OSO_2CH_2CH_3$, $CF_3CF_2CH_2OSO_2CH_3$, and $CF_3CF_2CH_2OSO_2CH_2CH_3$.

14. The solvent for non-aqueous electrolyte solutions according to claim 3, comprising at least one fluorinated linear sulfone selected from the group consisting of the following compounds:

15. The solvent for non-aqueous electrolyte solutions according to claim 3, comprising at least one fluorinated sulfonic acid ester selected from the group consisting of fluorinated linear sulfonic acid esters $HCF_2CF_2CH_2OSO_2CH_3$, $HCF_2CF_2CH_2OSO_2CH_2CH_3$, $CF_3CH_2OSO_2CH_2CH_3$, $CF_3CF_2CH_2OSO_2CH_3$, and $CF_3CF_2CH_2OSO_2CH_2CH_3$.

* * * * *